Jan. 4, 1949.   H. A. SKOG   2,457,840
DISCHARGING PEELED FRUIT FROM GROOVED CUPS
OF HALF-FRUIT PEELING MACHINES
Filed July 23, 1942   20 Sheets-Sheet 4
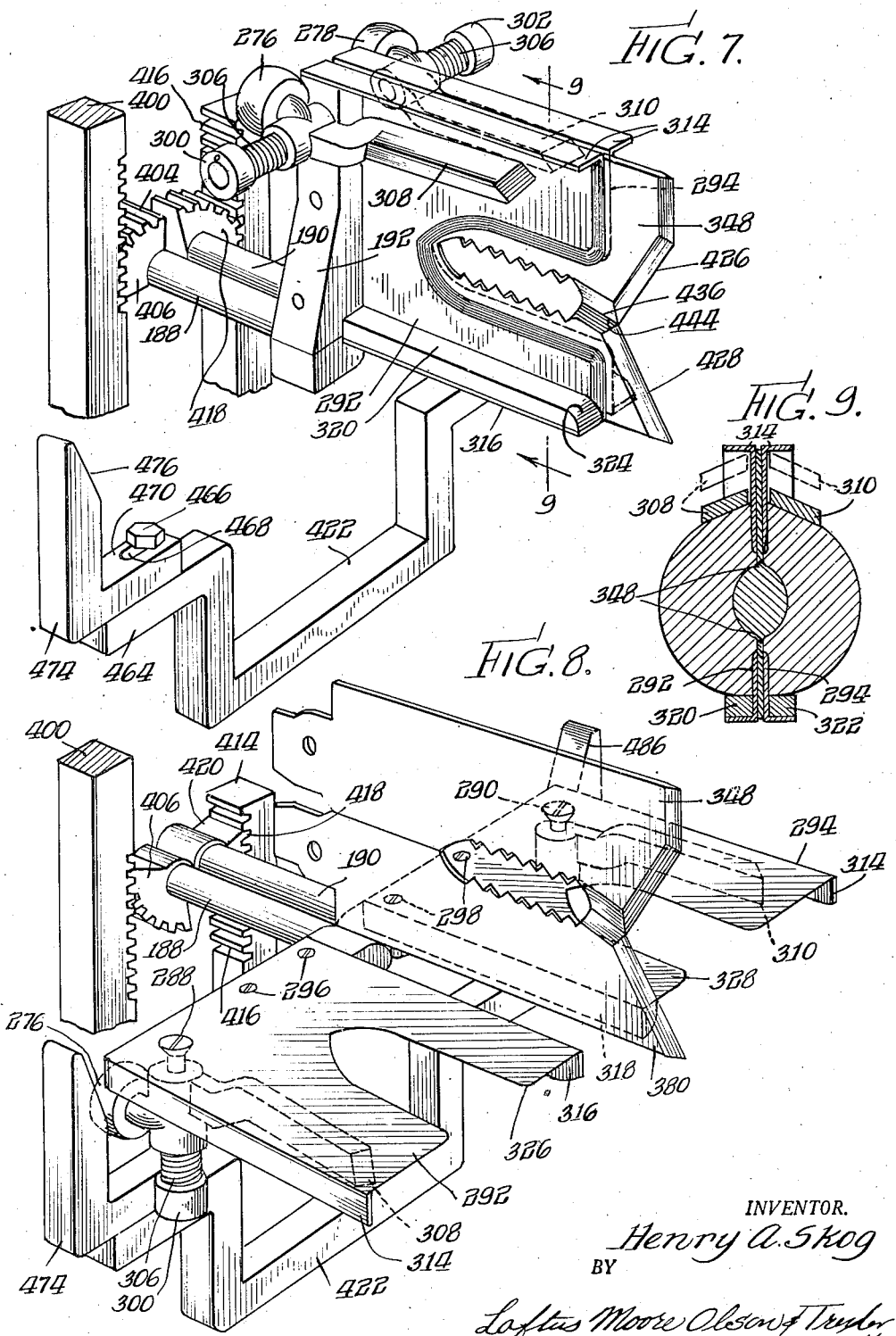
INVENTOR.
Henry A. Skog
BY
Loftus Moore Olson & Trexler
attys.

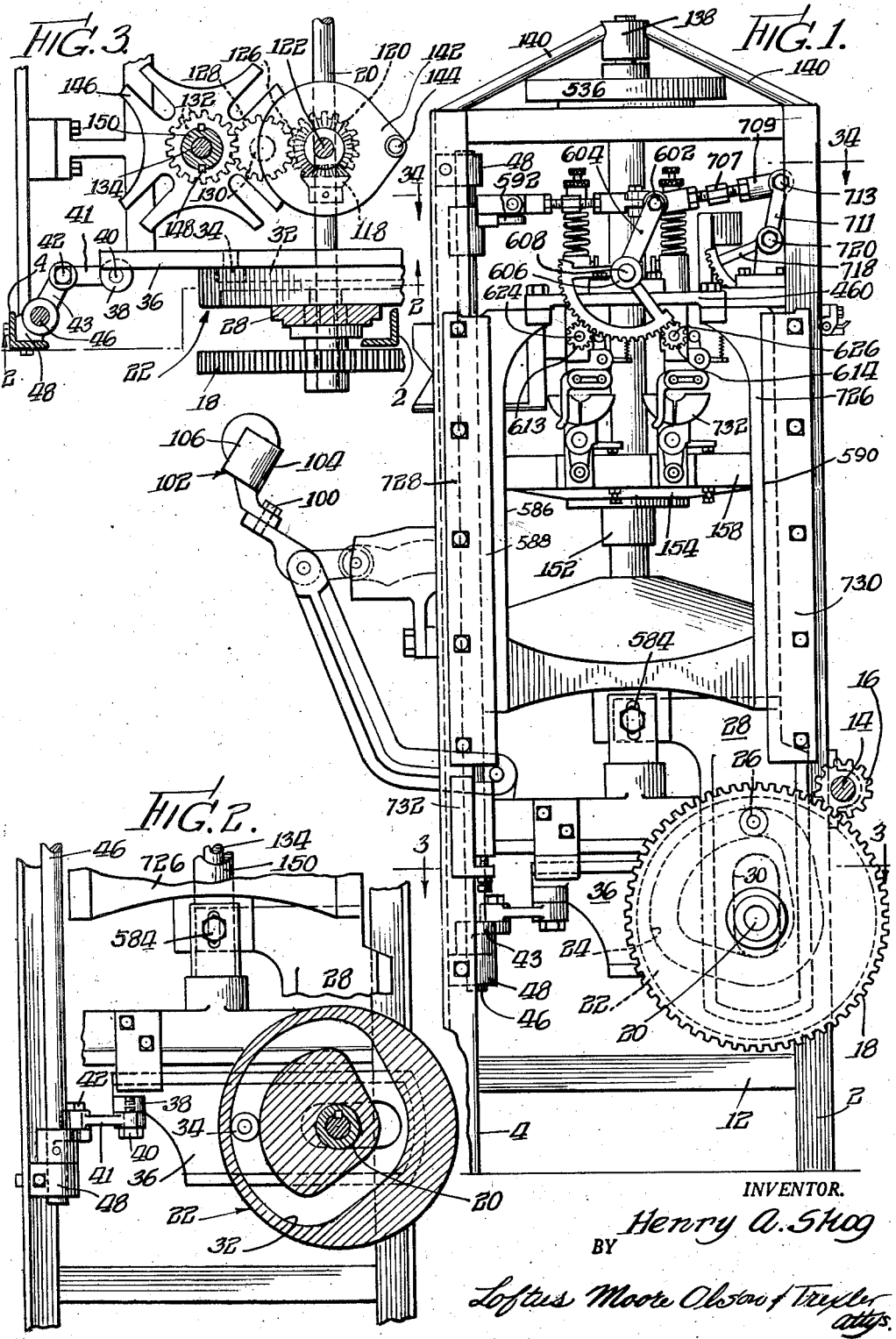

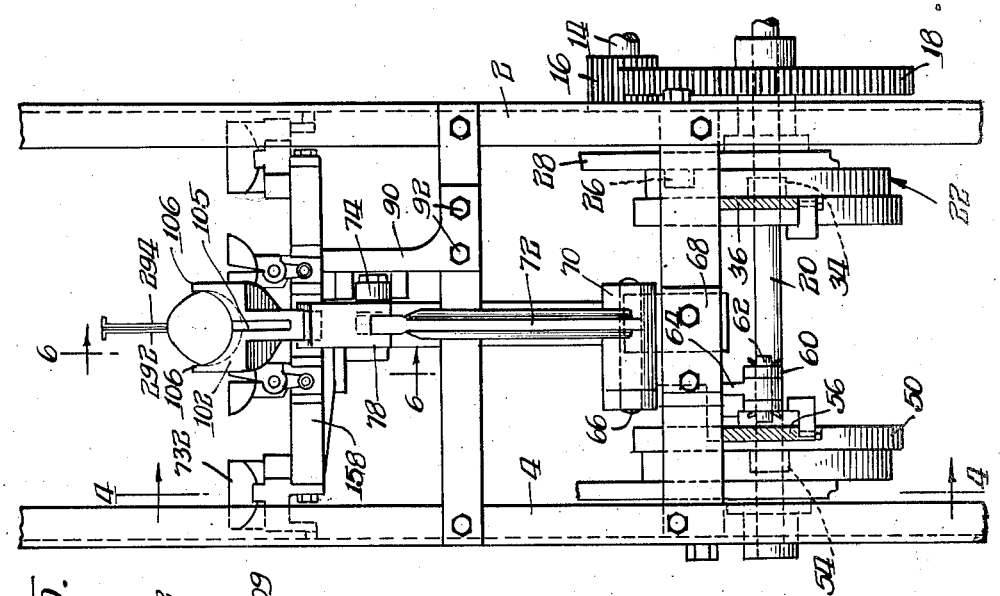

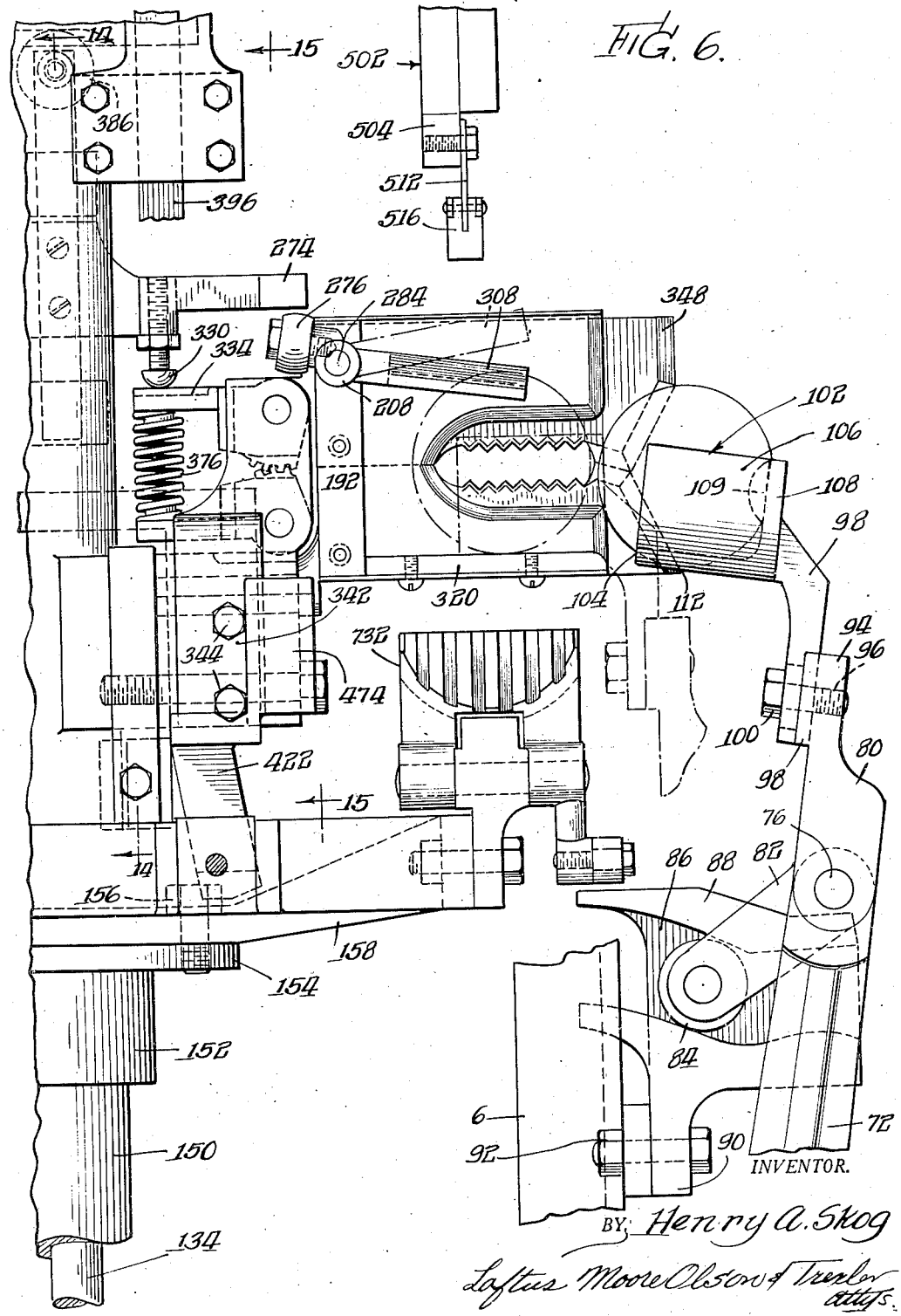

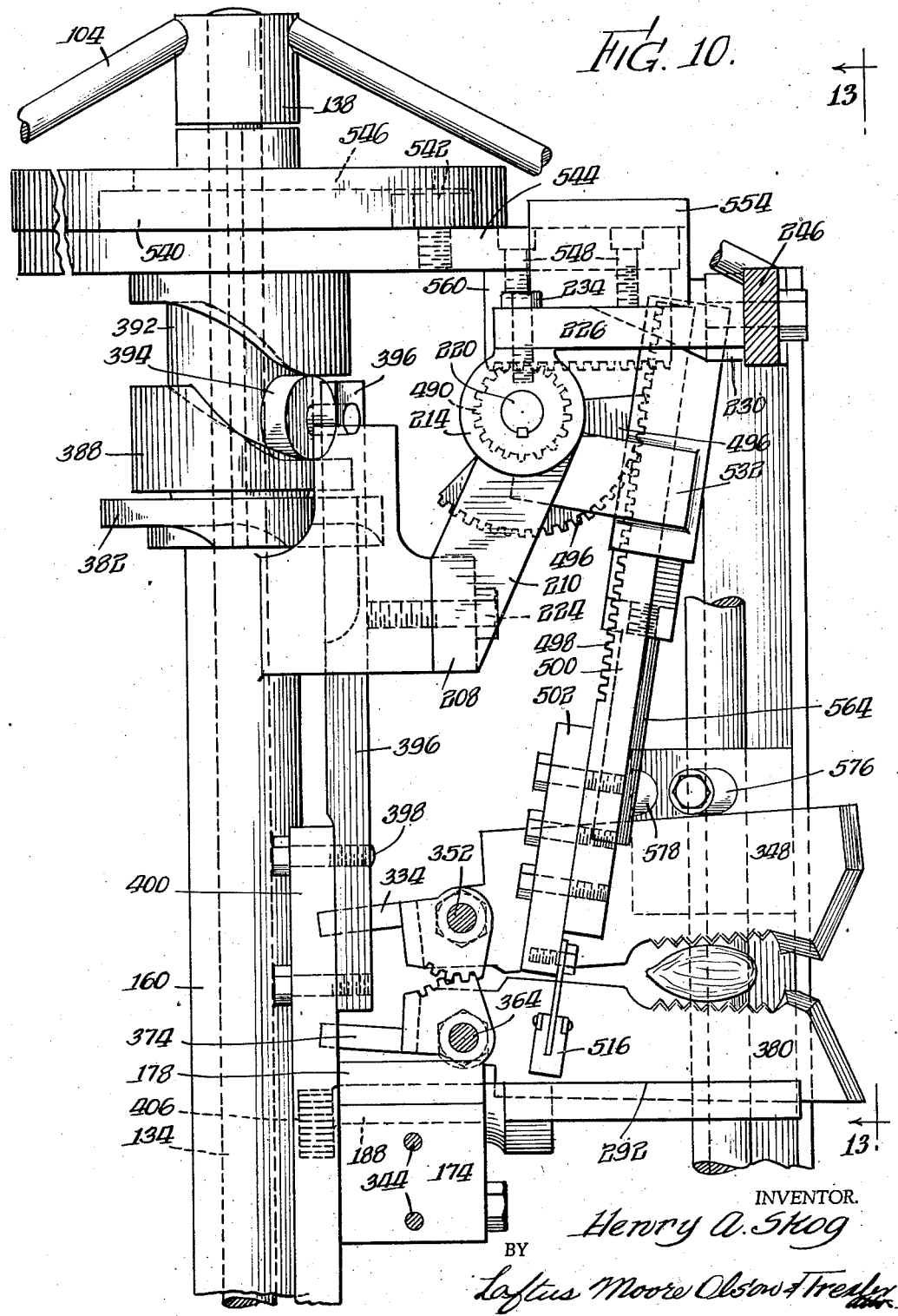

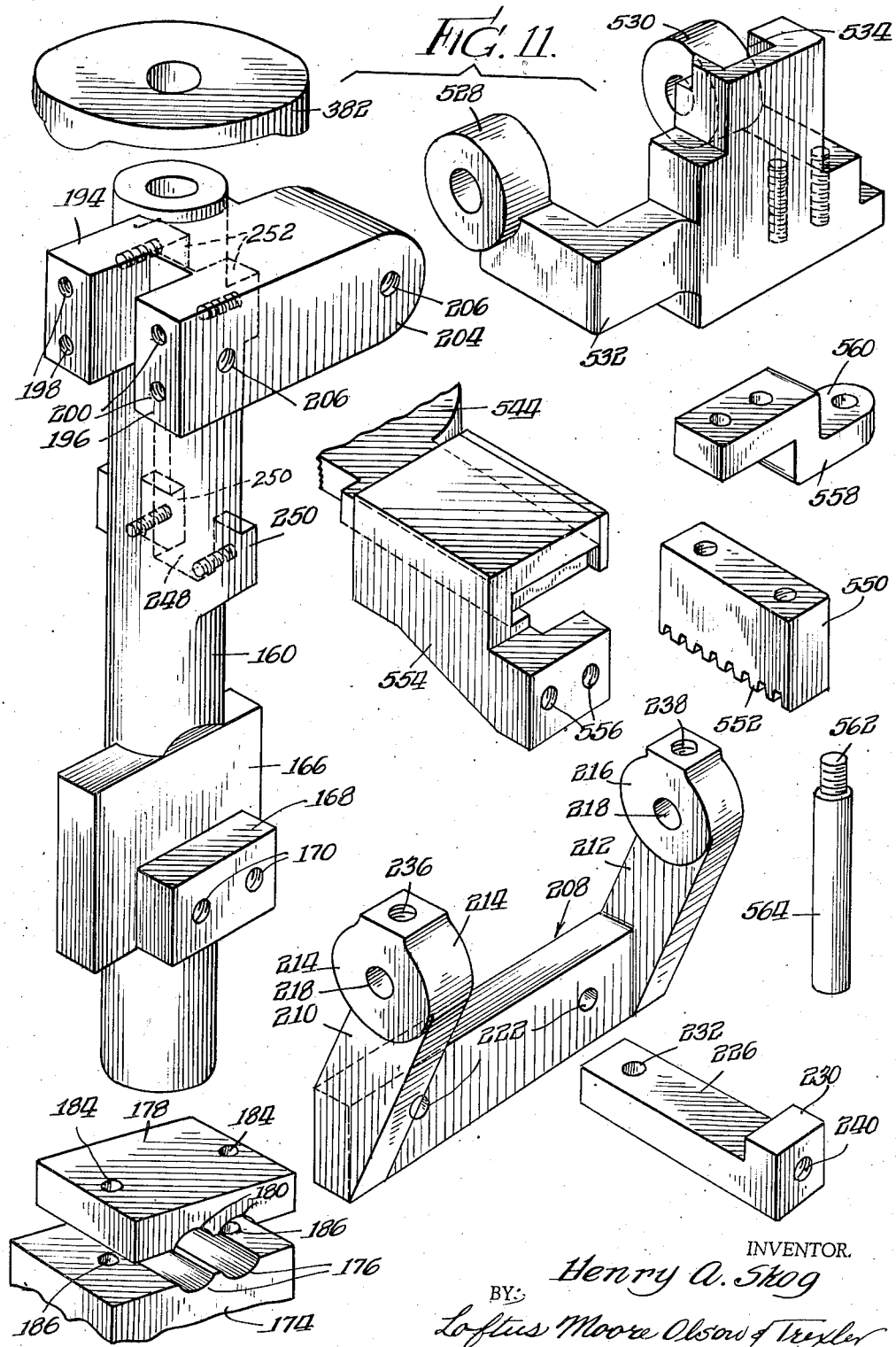

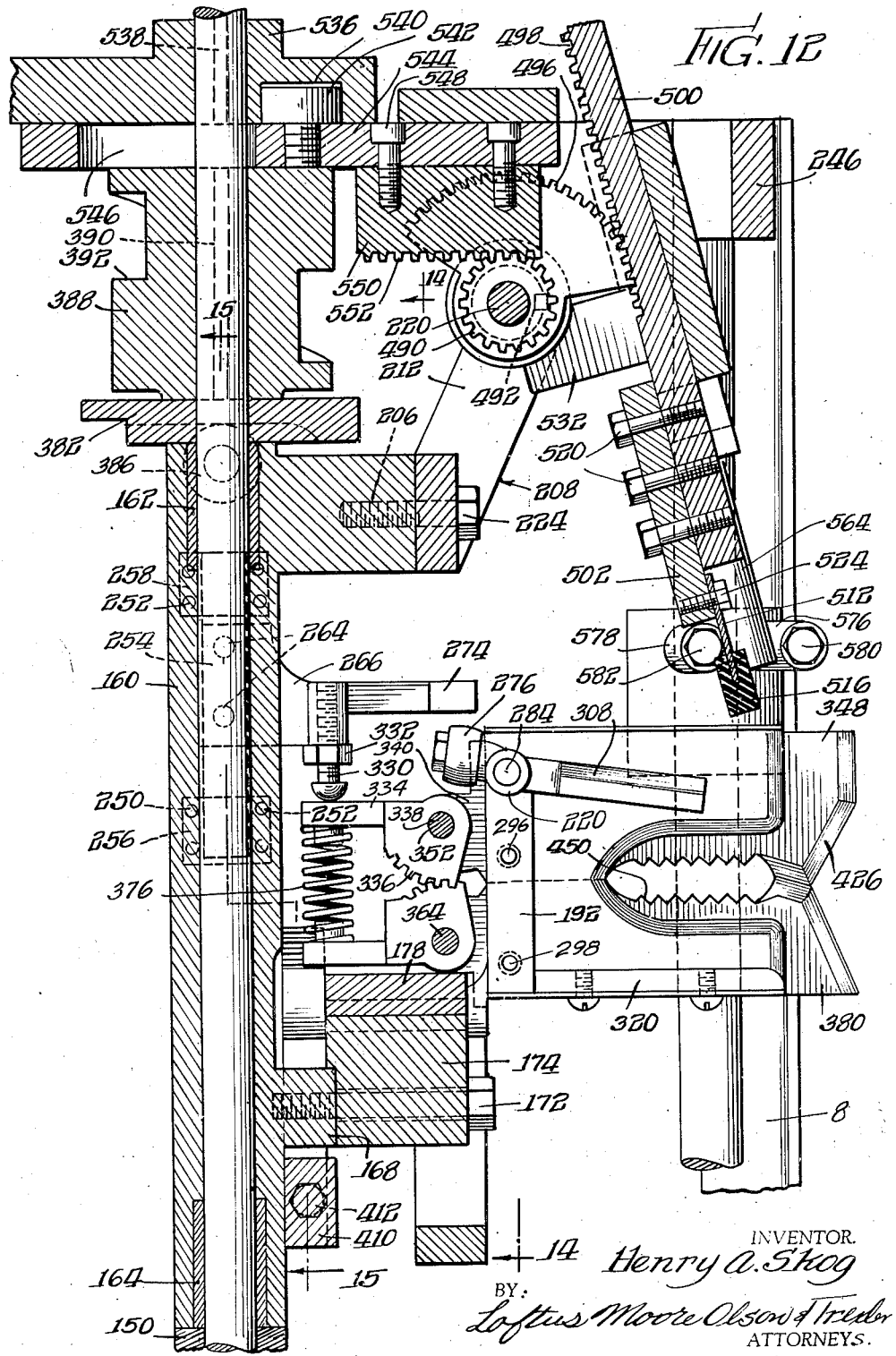

Jan. 4, 1949.  H. A. SKOG  2,457,840
DISCHARGING PEELED FRUIT FROM GROOVED CUPS
OF HALF-FRUIT PEELING MACHINES
Filed July 23, 1942  20 Sheets-Sheet 8

INVENTOR.
Henry A. Skog
By Loftus Moon Olson & Trexler
Attys.

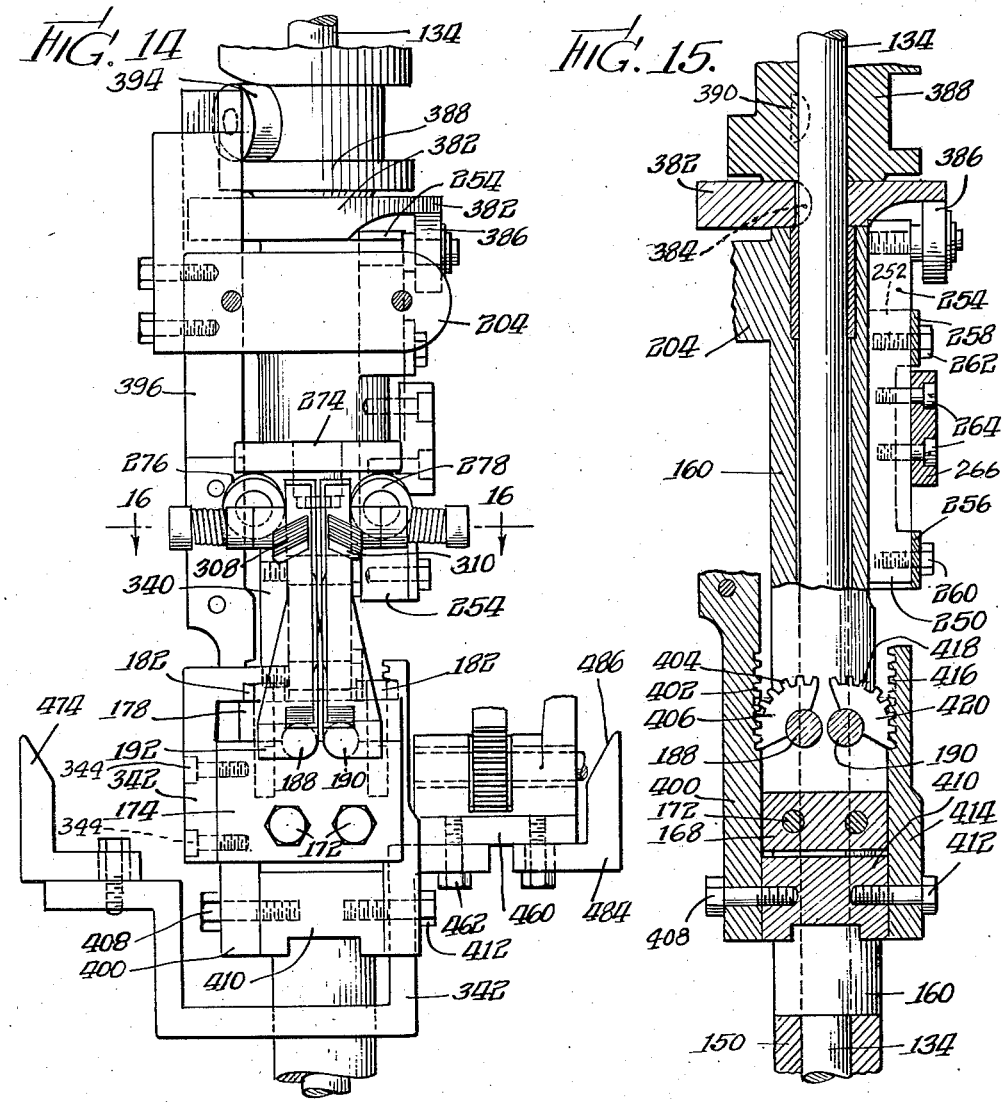
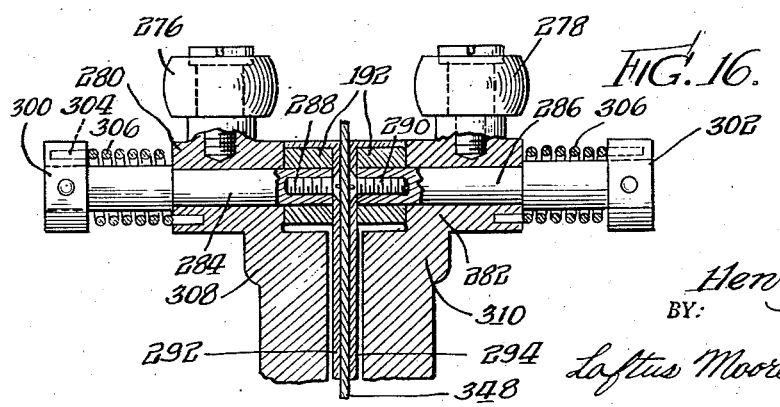

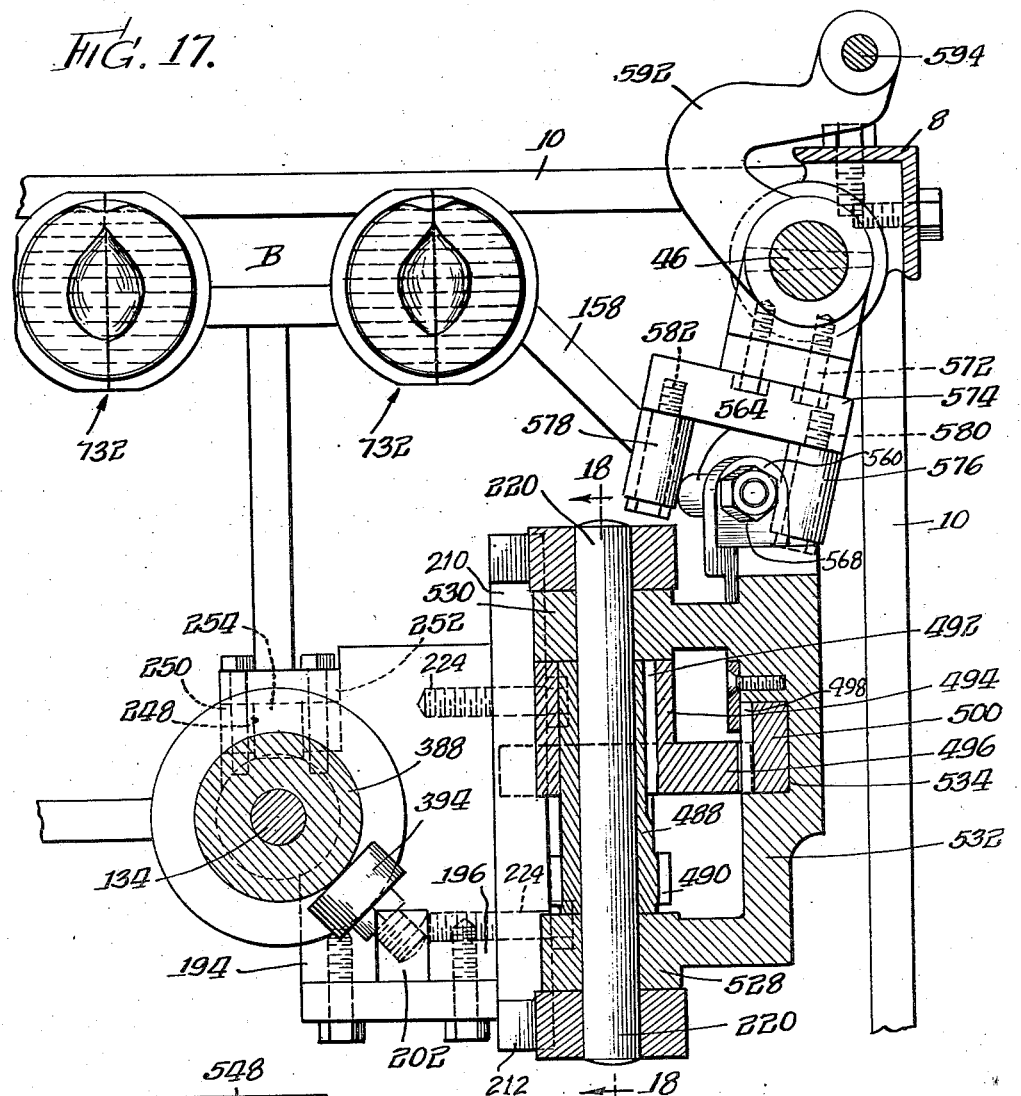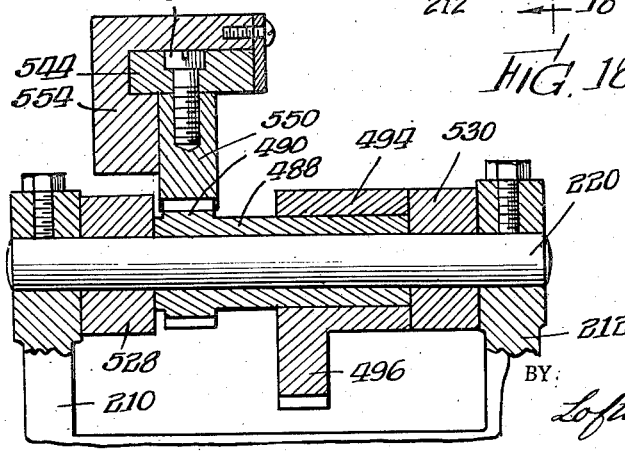

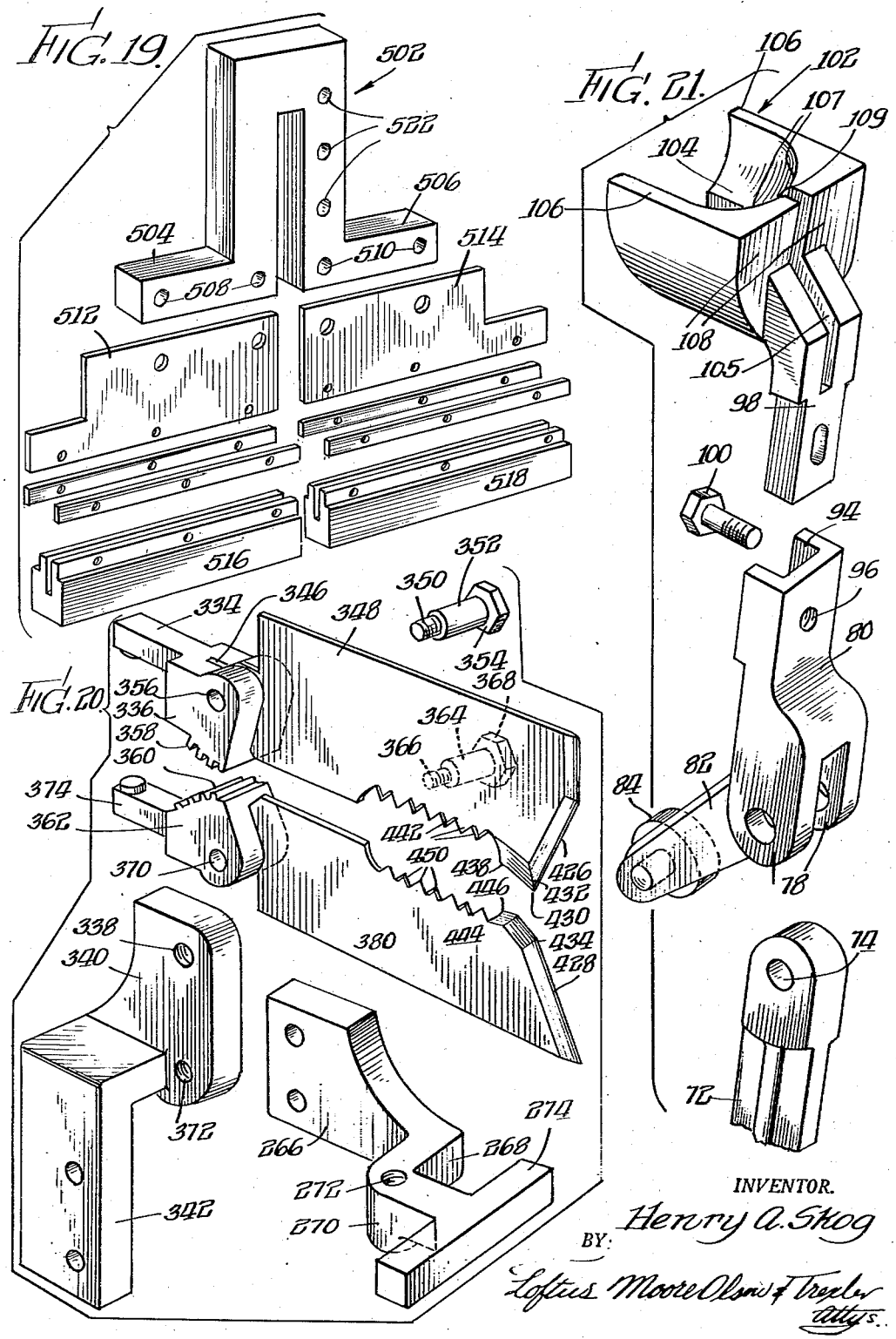

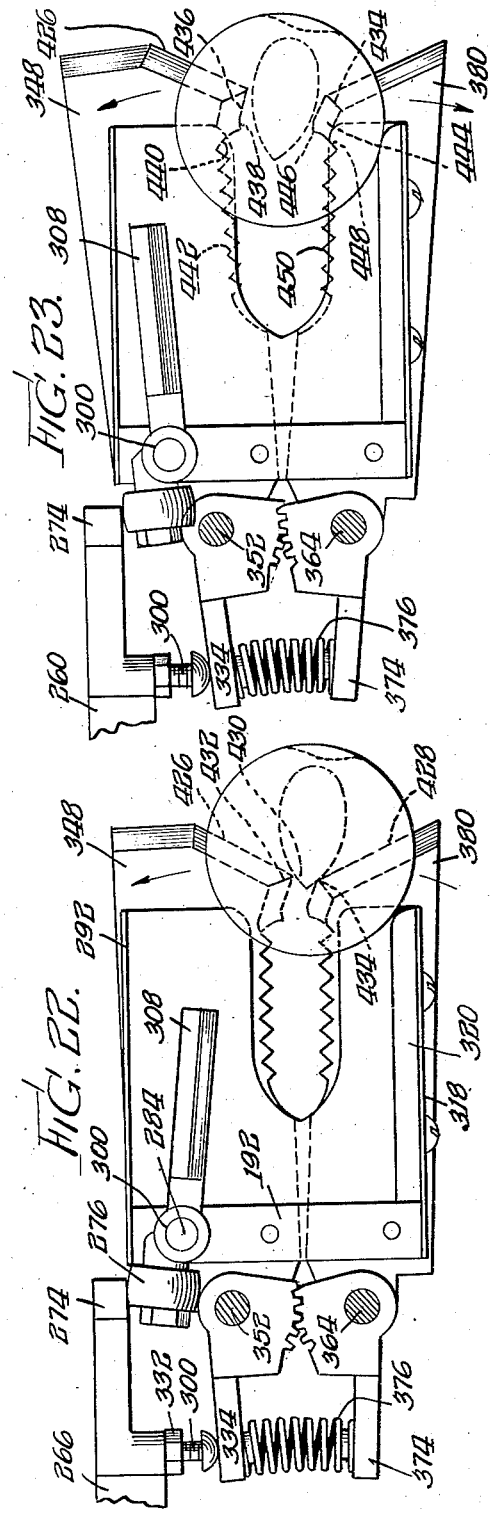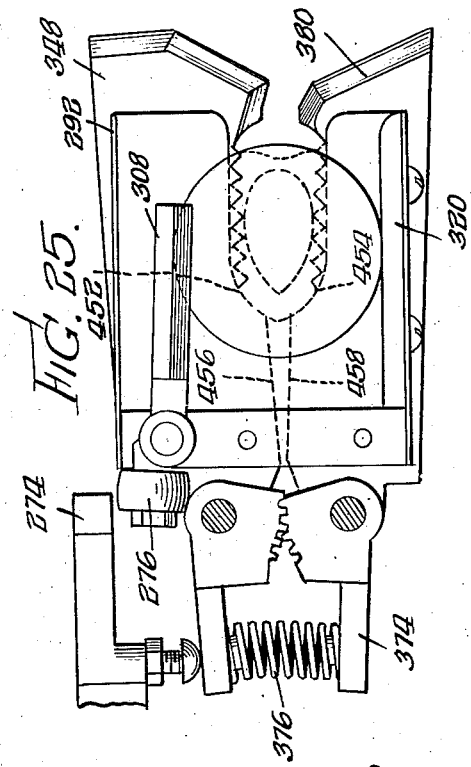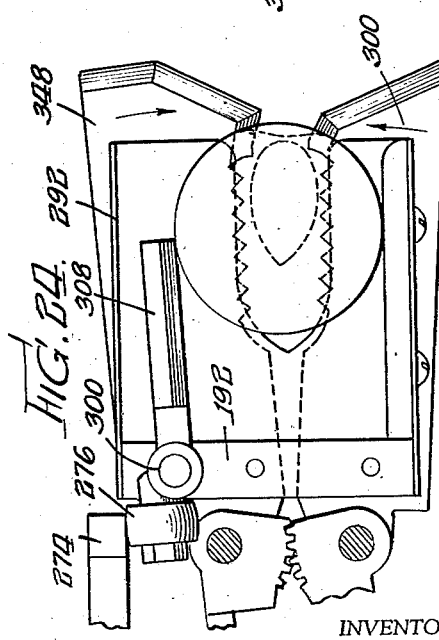

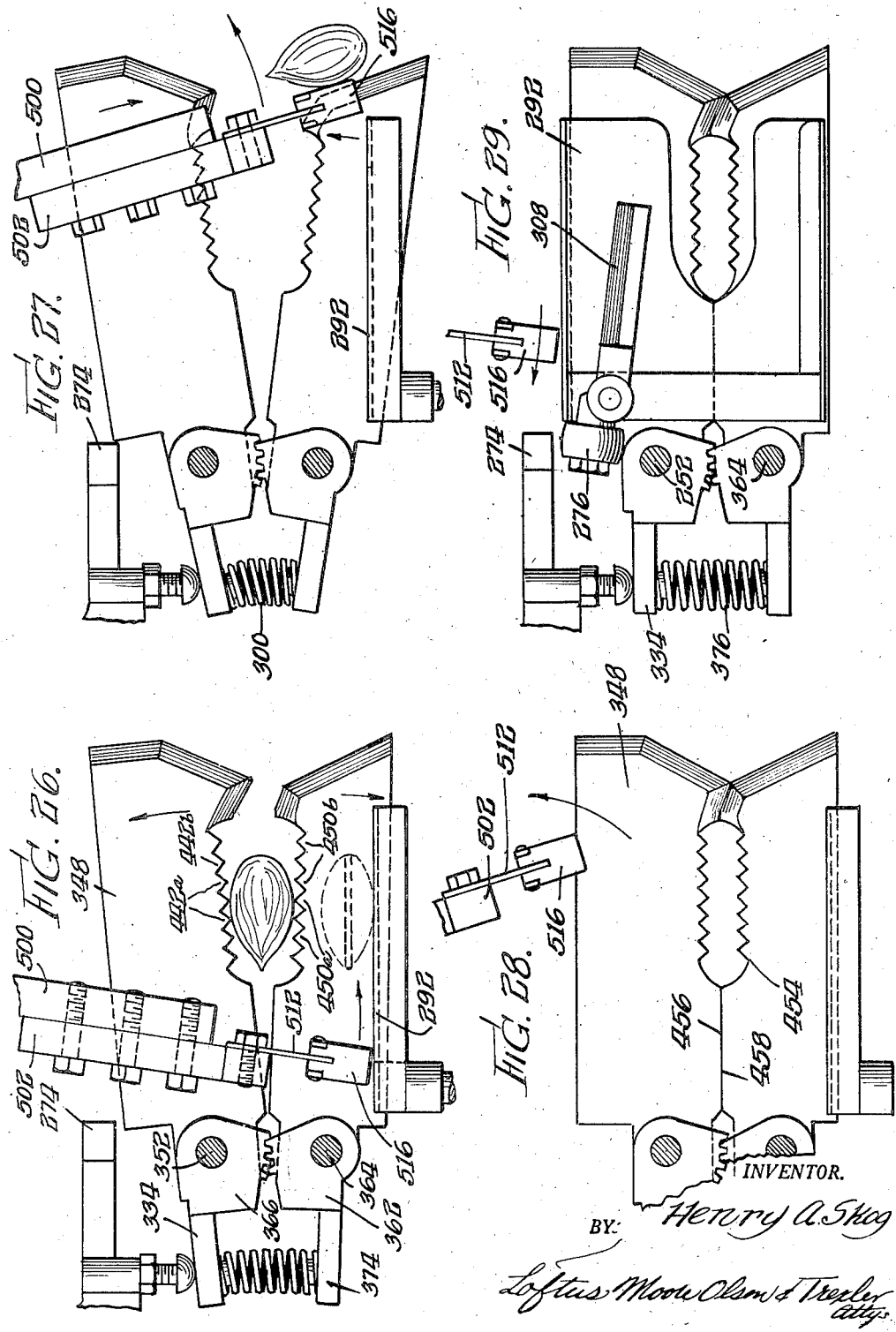

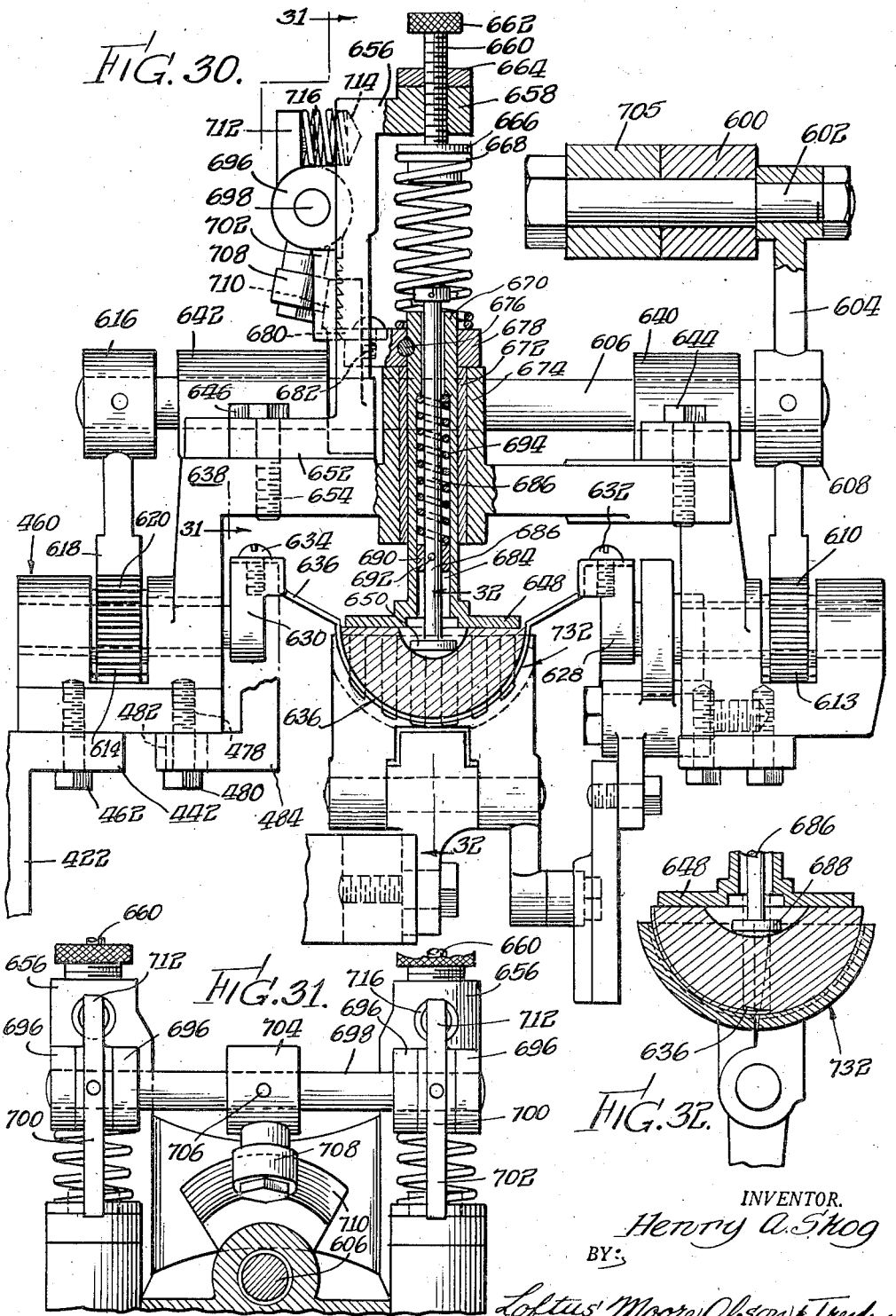

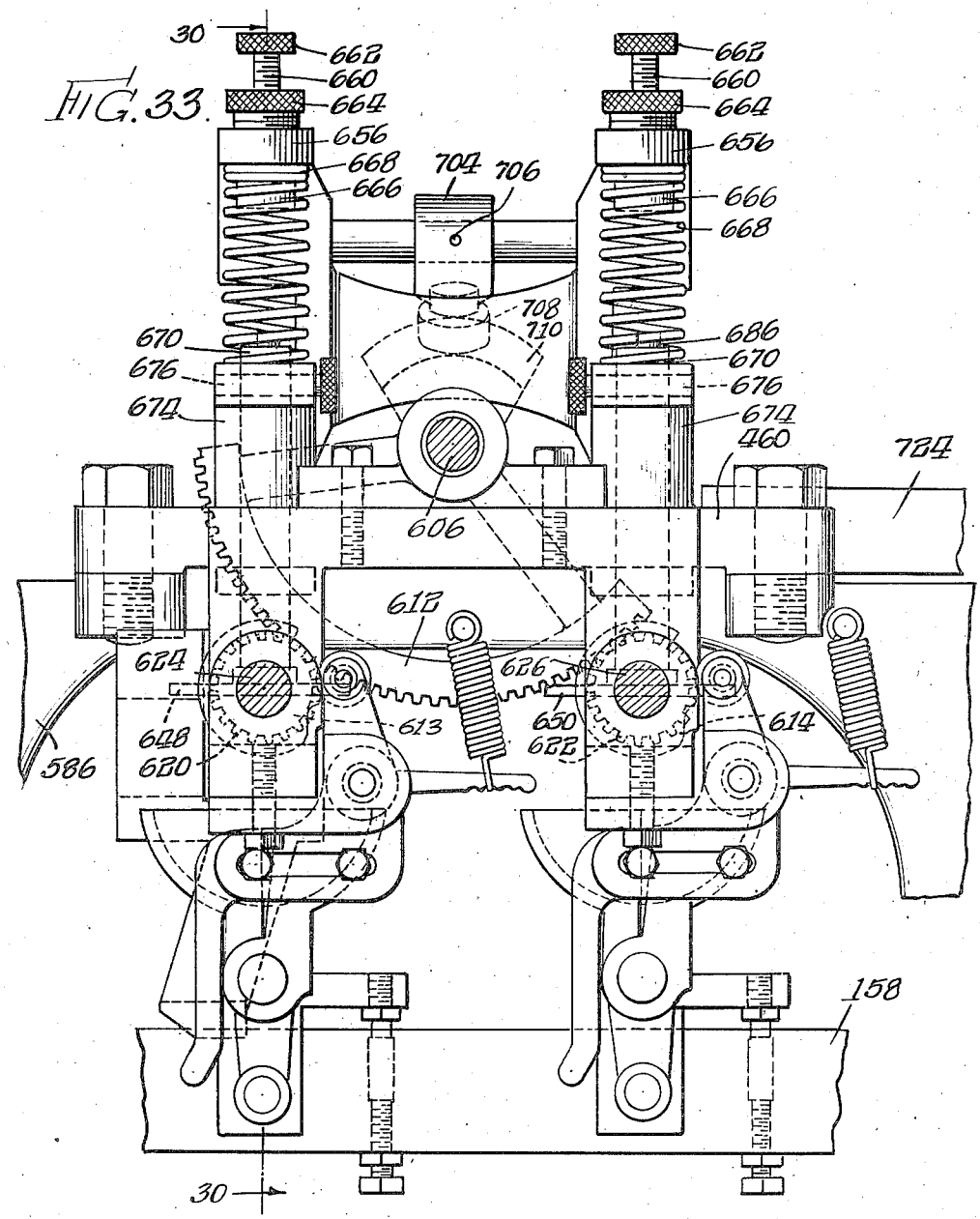

Jan. 4, 1949.
H. A. SKOG
2,457,840
DISCHARGING PEELED FRUIT FROM GROOVED CUPS OF HALF-FRUIT PEELING MACHINES
Filed July 23, 1942
20 Sheets-Sheet 16
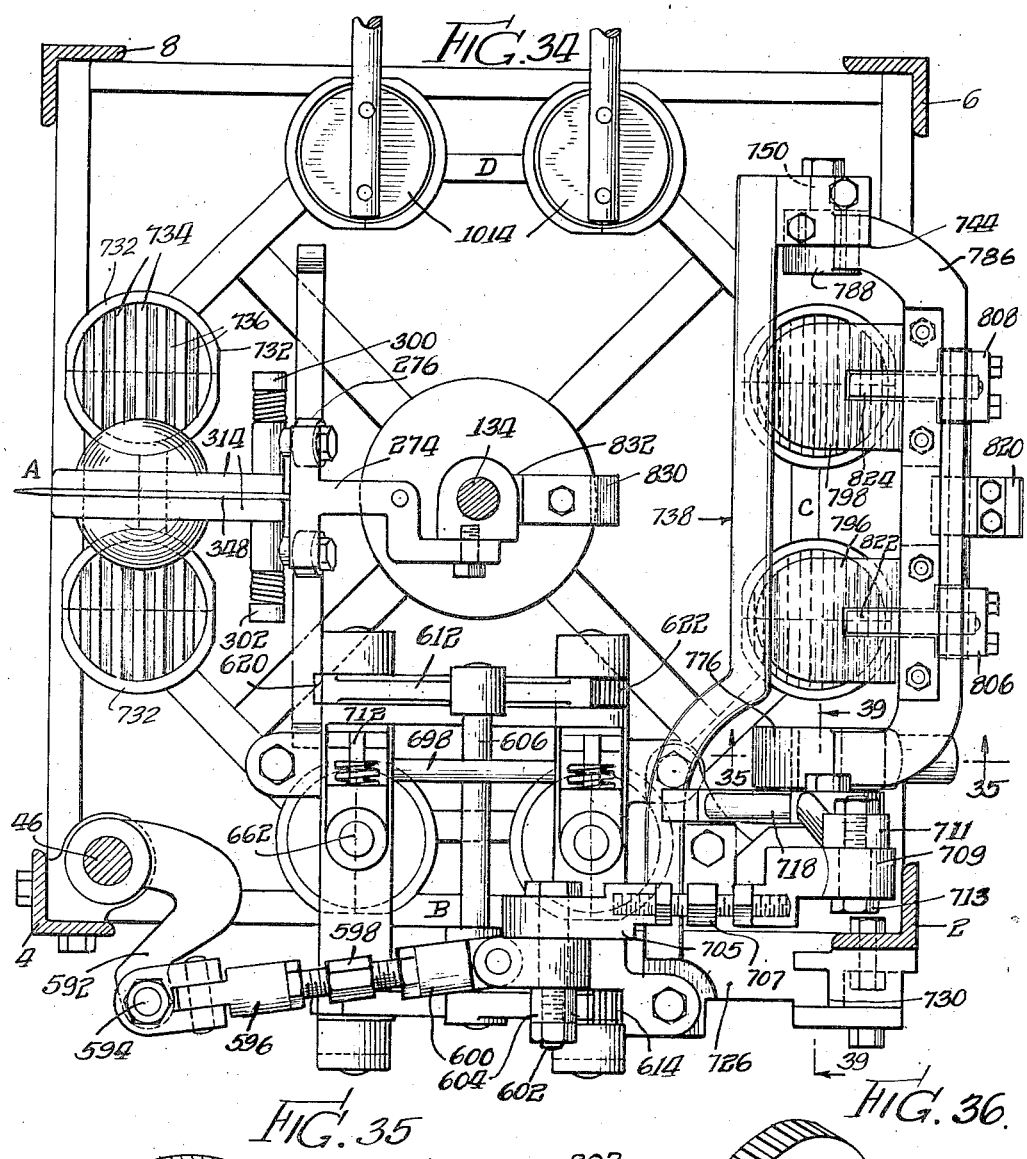
FIG. 34
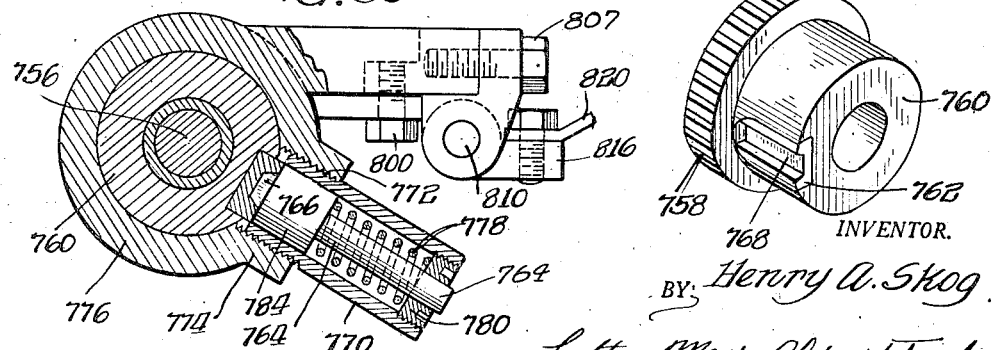
FIG. 35.
FIG. 36.
INVENTOR.
BY Henry A. Skog
Loftus Moore Olson & Trexler
attys.

Jan. 4, 1949.
H. A. SKOG
DISCHARGING PEELED FRUIT FROM GROOVED CUPS
OF HALF-FRUIT PEELING MACHINES
Filed July 23, 1942
2,457,840
20 Sheets-Sheet 17
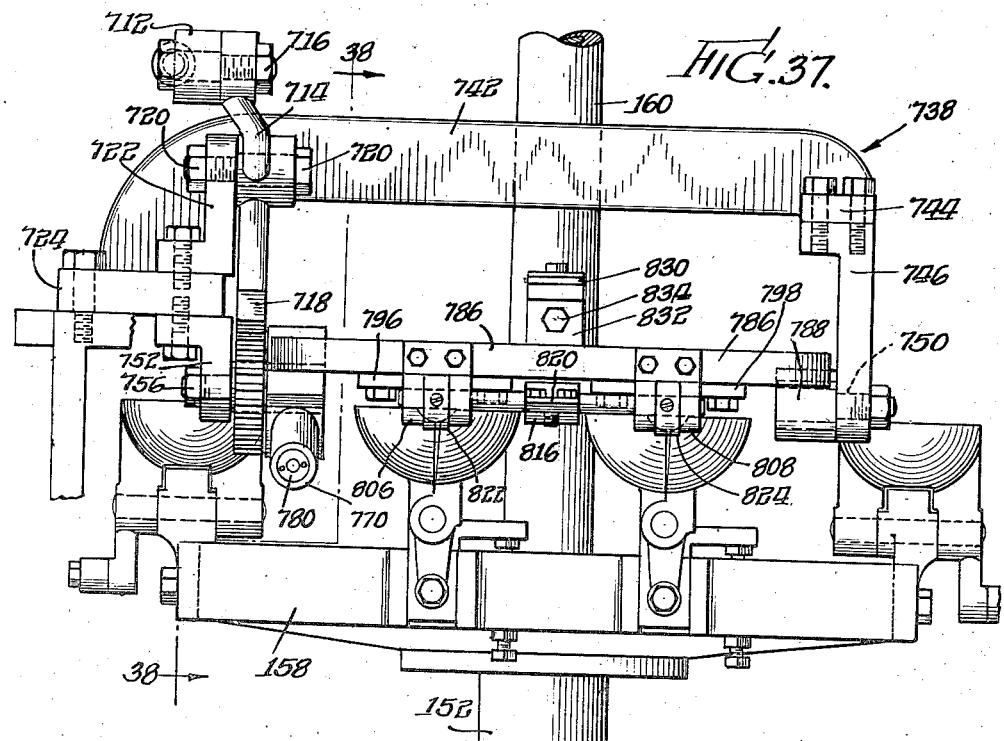
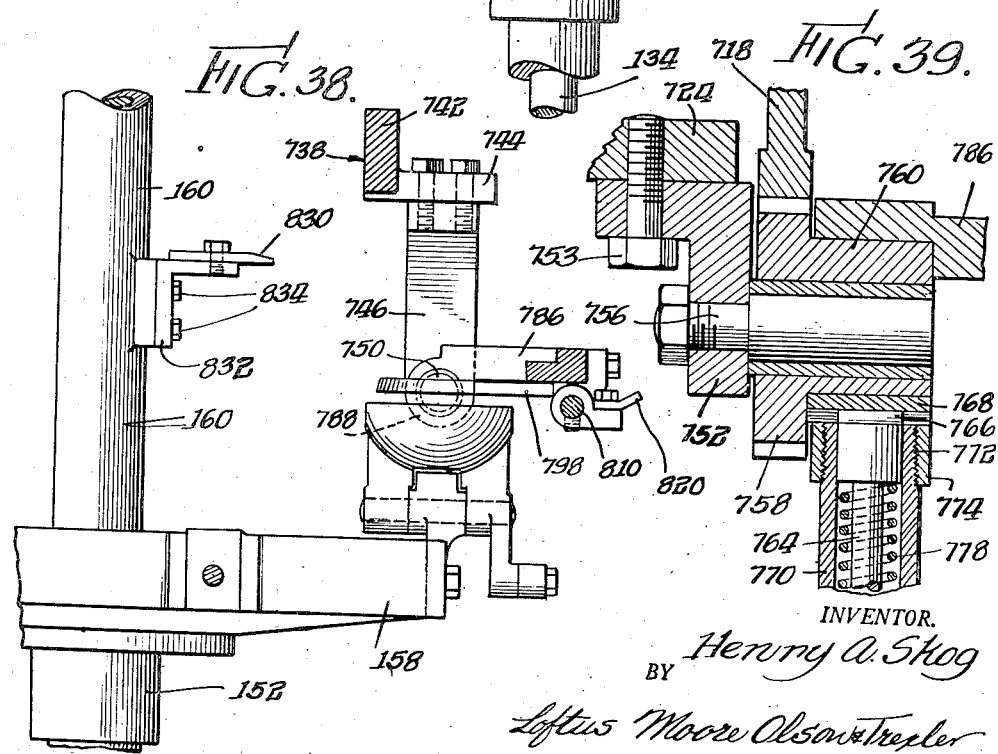
INVENTOR.
Henry A. Skog
BY
Loftus Moore Olson & Trexler
attys.

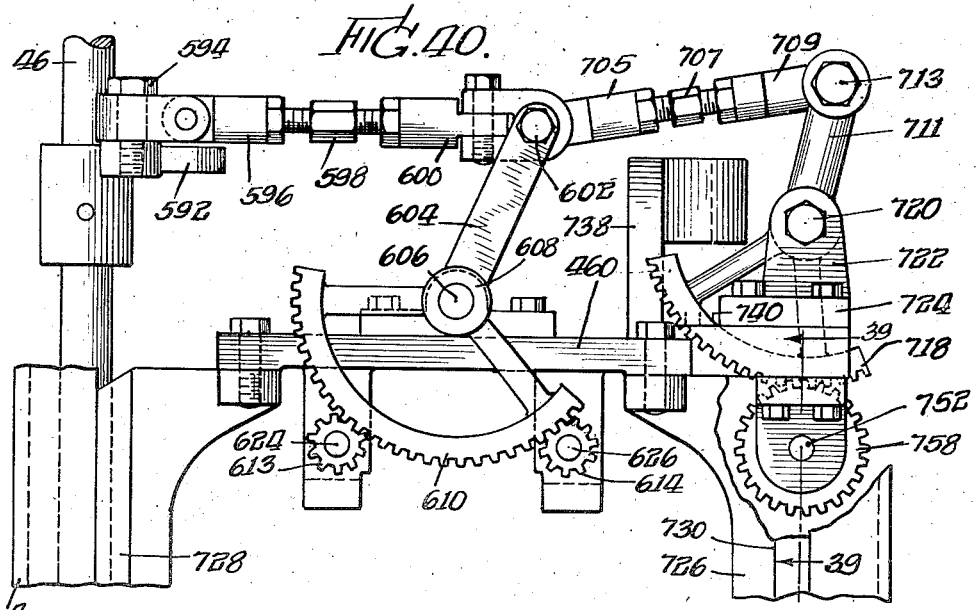
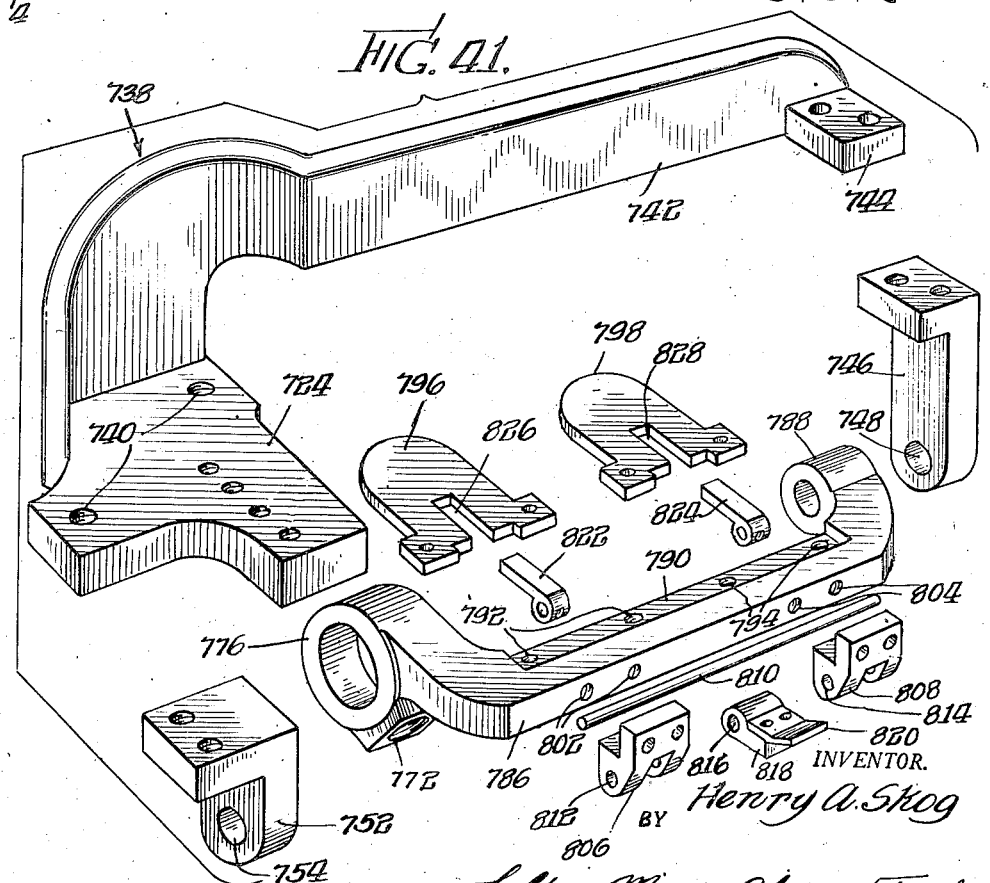

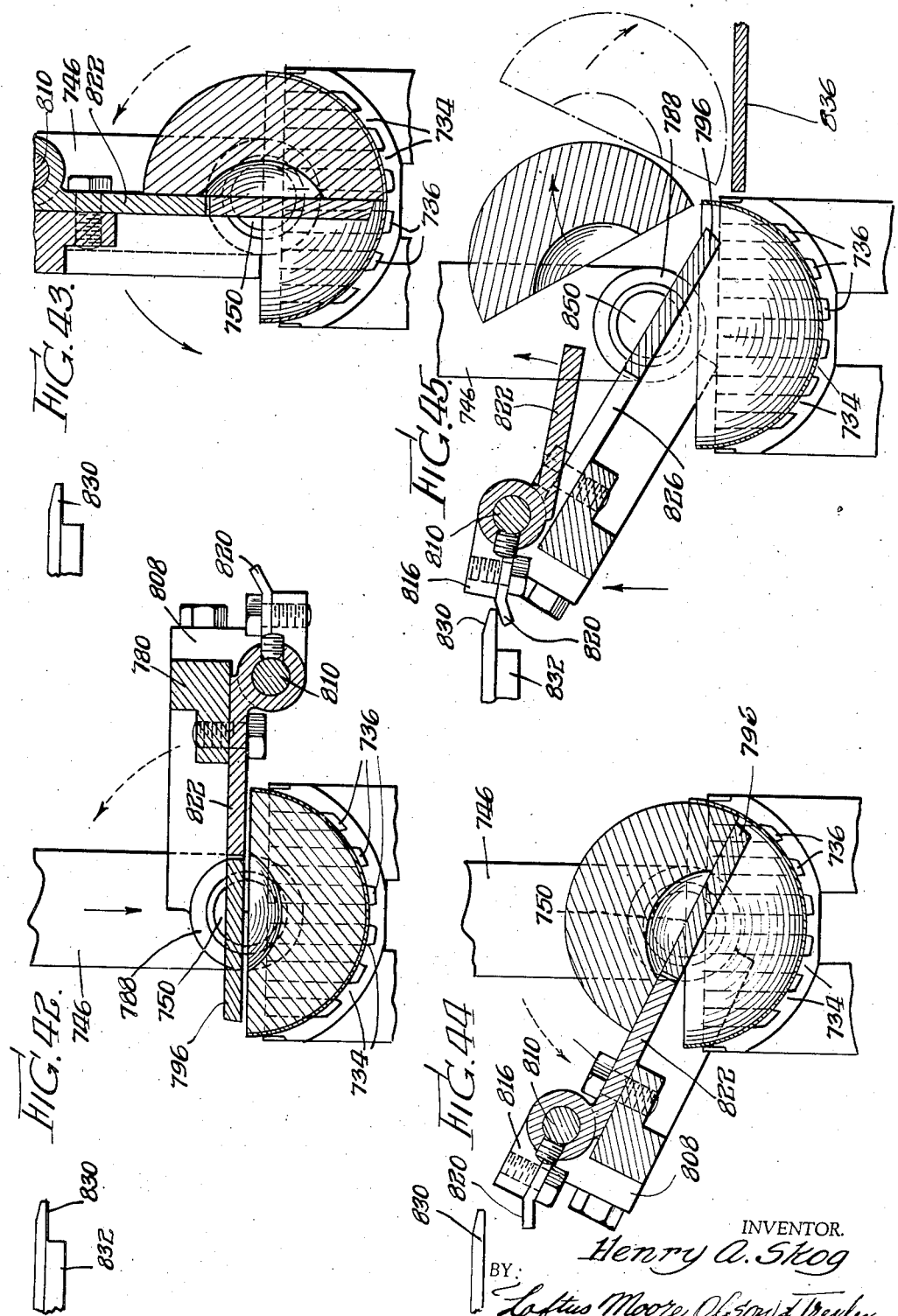

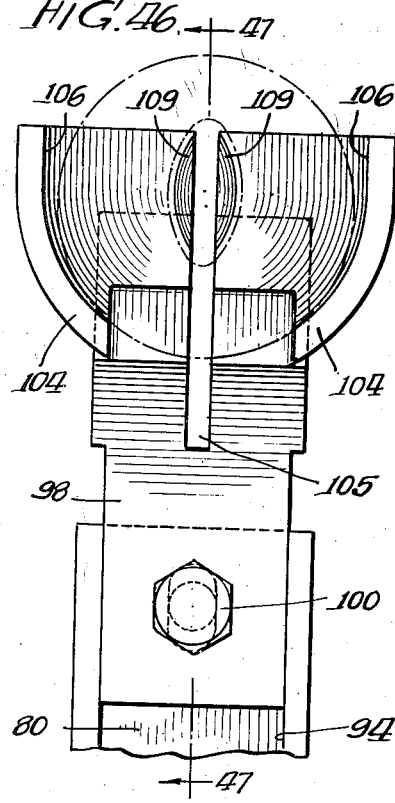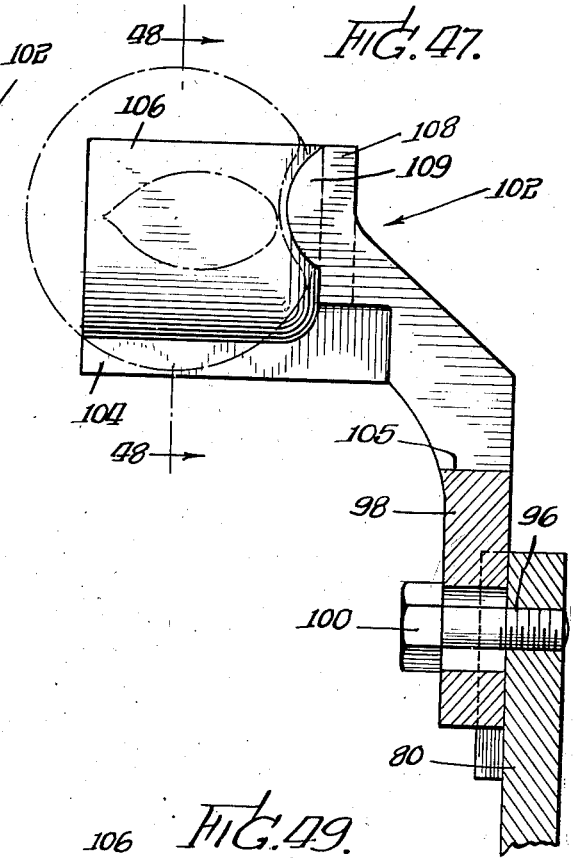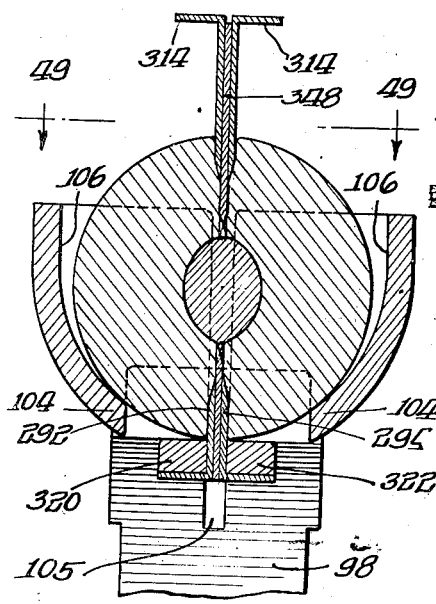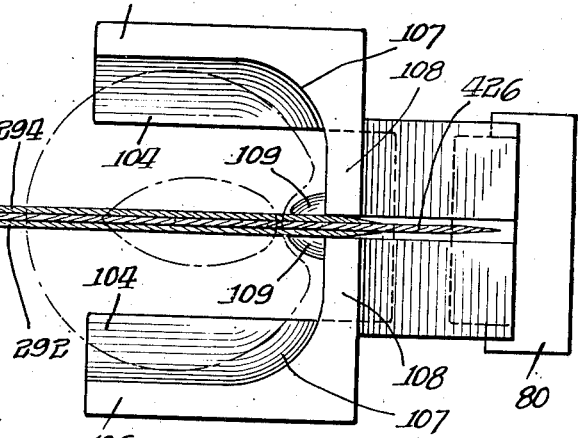

Patented Jan. 4, 1949

2,457,840

UNITED STATES PATENT OFFICE 2,457,840

DISCHARGING PEELED FRUIT FROM GROOVED CUPS OF HALF-FRUIT PEELING MACHINES

Henry A. Skog, Olympia, Wash., assignor to Special Equipment Company, Portland, Oreg., a corporation of Oregon Application July 23, 1942, Serial No. 452,052

39 Claims. (Cl. 146—241)

This invention relates to an apparatus, and also to a method, for treating fruit, particularly half fruits.

Among the objects of the present invention is to provide in an organized machine comprising a turret, shiftable to a plurality of successive stations in which fruit processing operations are carried out, the combination of means utilizing holders for receiving and holding at first unpeeled half fruits, wherein the internal walls of the holders are provided with means configured to grip the skin of the half fruit during the peeling operation, and likewise to prevent shattering of the peeling knives and bunching of the half fruit during such operation, and wherein means is likewise provided at a subsequent station adapted to cooperate with the conformations of the internal walls of said fruit cup whereby to discharge the peeled half fruit, and without discharging the peeling therefrom, the same being retained by the gripping mechanism of the internal walls of the half fruit holder; to provide in a combined machine having a fruit feed-in station a fruit peeling station and a fruit discharging station, associated fruit cups having internally formed grooved walls adapted to cooperate with the peeling mechanism in a manner such that the peeling knives sweep in directions parallel with the grooves and further, in combination with a fruit discharging mechanism adapted to sweep through the walls of the fruit cups at an angle to the direction of the disposition of the internal grooves of the fruit cups whereby to accomplish the discharge of the half fruit therefrom without disturbing the underlying loose peelings which have been cut from the half fruit; to provide in association with an automatic machine for mechanically processing half fruits, a discharge mechanism for discharging the peeled half fruit therefrom, with great rapidity and wherein the fruit is projected in a straight line movement directly outwardly of the machine with a minimum of impact, whereby to reduce the possibility of bruising the fruit during the ejection thereof from the machine; to provide a means for gently ejecting a peeled ripe freestone peach from an automatic machine for peeling and otherwise processing the peach; to provide in an automatic machine a fruit discharging mechanism therefor whereby the peeled half fruit is turned out of the peeling cups and projected gently from the paddle in line with the turning whereby to reduce bruising of the discharged fruit to the minimum; to provide in an automatic machine for processing, peeling and discharging half fruits, a novel type of ejector mechanism which by its construction is quicker and easier to change from one size of fruit to another; to provide a fruit discharging mechanism which eliminates the necessity of holding the severed peeling underlying the half fruit at the periphery of the cup as proposed in prior patent constructions and to provide in lieu thereof means adapted to sweep through the fruit holder cup in a manner to eject the peeled half fruit and not disturb the underlying peeling; to provide a half fruit discharging mechanism for an organized machine wherein the fruit is discharged directly laterally outwardly with a gentle rolling motion; to provide in an organized machine an improved safety device for preventing the jamming of the fruit discharging mechanism in case of the breakage of a peeling knife in the fruit cup prior to reaching the fruit discharging station; to provide an improved means for kicking the half fruit from the fruit discharging paddle; to provide an improved method of processing half fruit; to provide these and other objects, as will be apparent from a perusal of the following specification when taken in connection with the accompanying drawings.

Referring now to the drawings:

Figure 1 is a front elevational view of one side of the machine.

Figure 2 is a vertical sectional view of the lower portion of the machine as in Figure 1 and being taken on the line 2—2 of Figure 3.

Figure 3 is a plan sectional view on line 3—3 of Figure 1.

Figure 4 is a vertical sectional view taken on line 4—4 of Figure 5.

Figure 5 is a right side view of the machine showing the fruit feeding mechanism.

Figure 6 is a side sectional view showing the fruit feeding and splitting sections taken on line 6—6 of Figure 5.

Figure 7 is a perspective view of the splitting and separating blades in closed position.

Figure 8 is a similar view of the same blades in open position.

Figure 9 is a detailed sectional view taken on line 9—9 of Figure 7.

Figure 10 is a side sectional view of the fruit feeding station taken on line 10—10 of Figure 13.

Figure 11 is a detailed perspective view of some of the associated parts of the machine, as shown in assembly in Figure 10.

Figure 12 is a vertical sectional view taken on line 12—12 of Figure 13.

Figure 14 is a vertical sectional view taken on line 14—14 of Figure 12.

Figure 15 is a vertical section taken on line 15—15 of Figure 12.

Figure 16 is an enlarged detailed sectional view taken on line 16—16 of Figure 14.

Figure 17 is a detailed plan sectional view taken on line 17—17 of Figure 13.

Figure 18 is a detailed sectional view taken on line 18—18 of Figure 17.

Figure 19 is a perspective view of associated parts of the wiper blade mechanism.

Figure 20 is a perspective view of the associated parts of the fruit splitting mechanism.

Figure 21 is a perspective view of the fruit feeding cup and associated parts.

Figure 13:
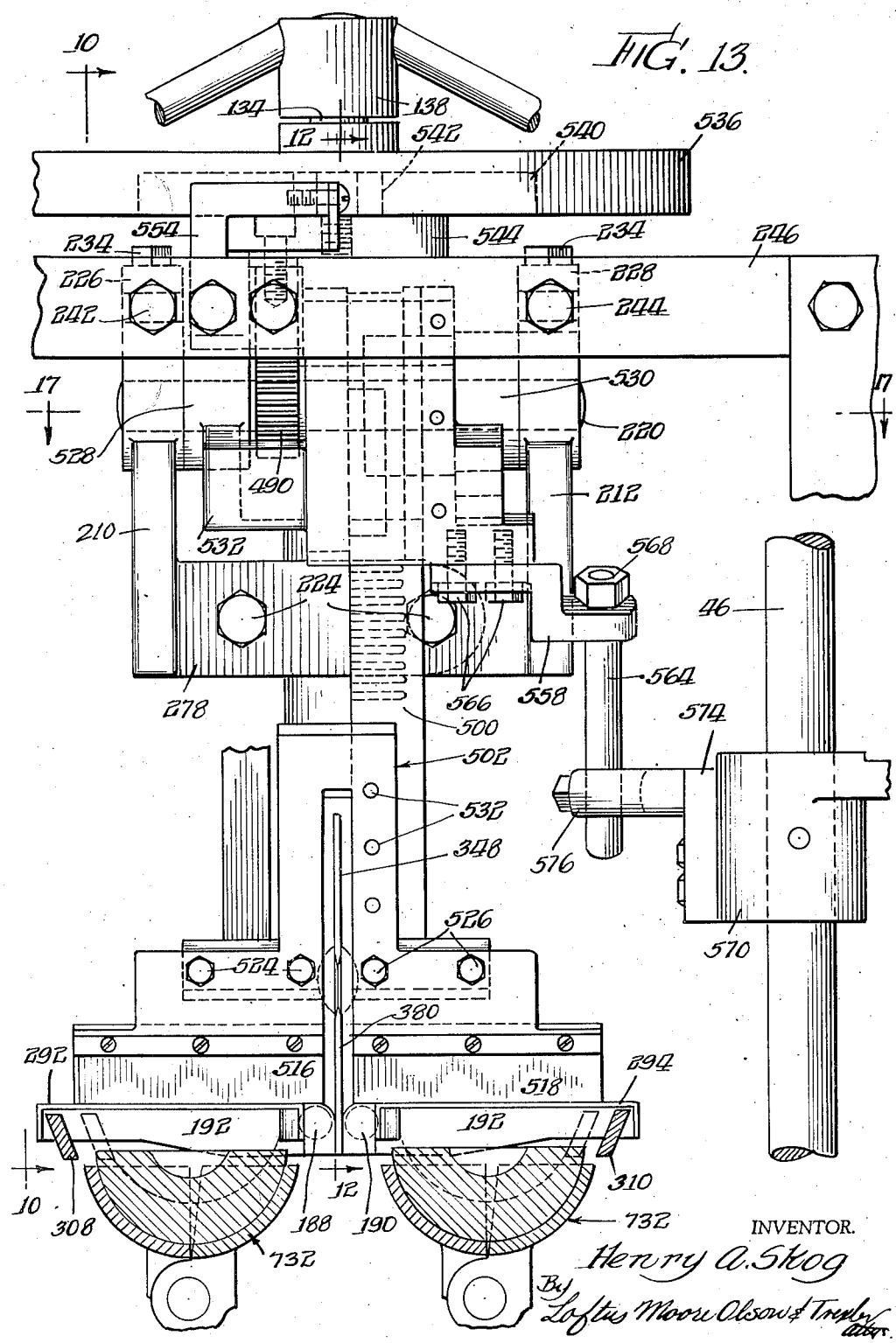
Figure 13 is a front sectional view of the fruit feeding station taken on line 13—13 of Figure 10.

Figures 22 to 29, inclusive, are views showing in consecutive order the treatment of the fruit as it enters, is split, separates, and is discharged from the separated blades, into the fruit cups.

Figure 30 is a cross sectional view of the peeling head taken on line 30—30 of Figure 33.

Figure 31 is a vertical sectional view of the peeling head taken on line 31—31 of Figure 30, showing the fruit cups in raised position.

Figure 32 is a detailed sectional view taken on line 32—32 of Figure 31.

Figure 33 is a front elevational view of the peeling head and its relative position with the peeling cup during the peeling operation.

Figure 34 is a plan sectional view taken on line 34—34 of Figure 1.

Figure 35 is a detail sectional view taken on the line 35—35 of Figure 34.

Figure 36 is a perspective view of a driving pinion.

Figure 37 is a side elevational view of the discharging mechanism.

Figure 38 is a vertical sectional view taken on line 38—38 of Figure 37.

Figure 39 is a fragmentary detailed sectional view taken on line 39—39 of Figure 40.

Figure 40 is a front view of the driving mechanism for the discharging mechanism.

Figure 41 is a perspective view showing the associated parts of the discharging mechanism.

Figures 42 to 45, inclusive, are successive views showing the operation of the fruit discharging mechanism.

Figure 46 is a front elevational view of the whole fruit receiving cup which receives the whole fruit from the operator, the fruit being shown in dotted lines.

Figure 47 is a side sectional view taken on line 47—47 of Figure 46.

Figure 48 is a vertical sectional view taken on line 48—48 of Figure 47, showing the split halves of the fruit positioned in the fruit cup and severed by the splitting knives.

Figure 49 is a plan sectional view taken on line 49—49 of Figure 48 showing the fruit in dotted lines and projected onto the splitting knives.

The present invention relates not only to the means for discharging the processed fruit from the fruit holders, but also relates to a combination of this means with a turret provided with stations therearound for performing certain operations upon half fruits which have been deposited in ribbed cups and wherein certain of the processing mechanisms, such for instance as the peeling mechanism, function to peel the half fruits while supported within the ribbed cups in such a manner that the peeling knife cooperates in a peculiar way with the directional relation of the ribs and grooves of the cups, and wherein also the fruit discharging mechanism which is placed around the turret at another station cooperates with the ribs and grooves of the cups in entirely different relation and in a different manner, whereby to cause the proper and efficient expulsion of the peeled half fruits from the cups, leaving the peelings therein in a manner which eliminates the necessity of providing additional means for holding the peelings in the cups during the fruit discharging operation. In the present instance, the fruit holders are specifically shown as being internally ribbed and grooved, and as being mounted on a turret of an organized machine and shiftable to fruit feeding, fruit peeling, and fruit discharging stations, wherein various means are synchronized to cause the positioning of the fruit cups at the various stations and the automatic operation of the various processing mechanism on the fruit while held in the fruit holders or cups. The invention is also specifically claimed with relation to the specific details of construction of the fruit discharging mechanism per se.

The invention herein claimed is preferably shown as a part of an organized machine of the character disclosed in certain prior patents for processing fruit, such, for instance, as Patent No. 2,242,242, granted to Mark Ewald and Henry Skog, issued May 20, 1941; Patent No. 2,231,002, of February 11, 1941; Patent No. 2,216,165, of October 1, 1940; and also the pending application of Henry A. Skog, Serial No. 440,034, filed April 22, 1942, and entitled "Fruit treating apparatus," in which latter application claims are drawn to subject matter not herein specifically claimed.

Referring now more particularly to the drawings, the machine as shown in Figures 1 and 3 comprises four uprights of substantially L-shaped formation, such as 2, 4, 6 and 8 with appropriate top and bottom cross supports 12, whereby to provide a rigid upstanding skeletonized elongated box-like structure or frame. At the lower portion of this frame there is mounted in suitable bearings fastened to the frame, the main power shaft 14 carrying a pinion 16 engaging with the peripheral teeth of a large gear 18 mounted on a parallel shaft 20 which likewise has appropriate bearings in the main frame. Keyed to the shaft 20 within the border of the uprights of the frame, as shown in Figures 2, 3 and 5, is a cam disc 22 which on one face carries the cam track 24 (see Figure 1) in which is disposed for operation a cam roller 26 mounted on a vertically operating slide 28. This slide 28 is provided with a vertically disposed elongated slot 30 which straddles the shaft 20, whereby to assist in guiding the slide 28 in its vertical reciprocatory movements. This slide is designed for raising and lowering the peeling head hereinafter referred to.

In addition, the cam disc 22, on its opposite face, is provided with a second cam track 32 (see Figure 2) within which operates a cam roller 34 (see Figure 2), which roller is attached to a horizontal slide 36 having an outwardly extending lug 38 (see Figure 2) in the form of a collar carrying a pin 40, which pin supports a link 41, the outer end 42 being pivotally connected with a crank 43 connected to the lower end of a vertical shaft 46 mounted in suitable bearings 48 on the stationary frame. By interconnecting the horizontal slide 36 and the link 41 with the crank 43 the straight line motion of the slide 36 will cause the circular oscillating motion of the shaft 46 for the purpose of operating the peeling cutters in the manner hereinafter described.

In addition, keyed to the shaft 20, as shown in Figure 4, is a second cam disc 50 provided with a cam track 52 shown in dotted lines in Figure 4, in which operates a cam roller 54 connected to a second horizontal slide 56 having at its outer end a connection 58 to an adjustable arm 60 in turn pivotally connected as at 62 to a crank 64 which is keyed to a shaft 66 mounted pivotally in a bracket 68 rigidly mounted on the main frame of the machine.

The opposite end of this shaft 66 carries a collar 70 having a substantially L-shaped arm 72 as shown in Figures 4 and 21, the upper end of which is provided with an aperture 74 to receive a pivotal pin 76 which passes through the furcations 78 of a bracket 80. In addition, the bracket 80 is provided with a rigid arm-like extension 82 which carries at its outer free end a cam roller 84 adapted to operate in a cam track 86 formed on the bracket 88 having a depending lug 90 bolted as at 92 to two of the vertical uprights 2 and 4 of the main frame. The upper end of the bracket 80 carries an upstanding guide 94 (Figure 21) and a threaded aperture 96 in which is slidably mounted a tongue 98. A bolt 100 serves to maintain the tongue in adjustable position relative to the bracket 80. This tongue, as shown in Figure 21, carries and supports the fruit receiver hereinafter described.

This fruit receiver has the function of manually receiving the whole peach which is placed therein by an operator and upon proper automatic operation of the L-shaped arm 72 the fruit will be positioned with respect to the mechanism in the machine as hereinafter described.

The upper portion of the bracket 98 carries the whole fruit receiver and positioning member for cooperation with the fruit splitting blades hereinafter mentioned. This fruit receiver comprises a cradle-like holder 102. This fruit holder is shown in Figures 21 and 46. It is open at the top and front so that a whole fruit such as a peach may be placed freely therein by the operator with the suture plane in a vertical position and directly overlying parallel ways or shelves 104. A slot 105 extends upwardly through the upper portion of the fruit holder bracket 98 sufficiently far so that when the fruit holder is given its maximum inward movement toward the fruit dividing or splitting blades the forward edges of the latter as shown in dotted lines in Figure 6, and the front edges of the fruit spreading blades will pass well into the slot in the fruit holder 102 and the fruit holding bracket 98.

Figures 4 and 6 show the opposite extreme position of the fruit holder 102 at which time it is substantially removed from the frame proper.

It will be noted that the vertical curved cradle-like inner walls 106 of the peach holder, as shown in Figures 46 to 49, extends from substantially the depth of the cup 102, the bottom portions forming the ways or ledges 104. These curved walls as seen in plan view are parallel to each other and have, spaced angularly from each side wall at substantially 90 degrees, a rear wall portion 108. These are in alignment with each other but are separated by the slot 105. A curved section 107 connects the side walls 106 and the rear walls 108. Formed on the rear walls 108 and disposed on either side of the slot 105 is a pair of buttons 109 to conform to the shape of the stem cavity of the whole peach. As will be seen in Figures 46 and 48 the peach rests mainly on the curved bottom walls 104 of the cup, and in this vertical position, the rear walls 108 back up and act as a pushing medium for pushing the peach in a substantially horizontal plane when moved across the vertical fruit knives.

In the position of the fruit holder 102, shown in Figure 4, these same walls 108 have been shifted to a position such that they each bear substantially one-half of the weight of the peach, and the entire upper portion of the holder is open so that the peach may be freely placed therein by the operator from a position above the fruit holder, and it will be noted that the bottom part of the peach rests partially on the parallel ways 104 and also on the surface of the rear walls 108, the suture line of the peach being located by properly placing the stem cavity of the peach over the buttons 109 on the rear walls 108, and since the suture line is thus located, the peach will automatically rest in the holder 102 in proper alignment for entering the slicing knives.

Should the peach be smaller than regular size or that shown in the drawings, the shelves or bars or ledges 320 and 322 formed on the lower flanges or edges 314 of the separating blades, and hereinafter described, will lift the peach up to its proper position on the spreader or separating blades.

Particular care should be taken that the suture plane of the peach in the majority of cases is coplanar with the plane of the slot 105 through the holder. In the majority of cases the suture plane will pass centrally of or through the peach, whereas in other instances the suture plane will be to one side but should be parallel to the plane of the slot 105. However, this represents only a small percentage of peaches.

In order to permit a vertical adjustment of the bracket 98 in the guideway 94 in cooperation with the bolt 100 and the threaded hole 96, the shank of the bracket 98 is provided with an elongated slot which permits of a limited range of adjustment of this bracket relatively to the carrier 80.

Due to the reciprocation of the cam slide 56 and its linkage connection 60 with the lever 64 and the pivotal axis 66, the fruit carrier operating arm 72 is swung about the horizontal pivot 66 in a vertical plane while at the same time the roller 84 mounted on the arm 82 has imparted to it the motion formed by the shape of the cam slot 86, thereby producing the following movement of the peach from the position shown in Figure 1 or 4 so that a center through the peach will move along the path shown by the dotted line in Figure 4 to the entering position shown in Figure 6 and from thereafter the peach will advance exactly in the pathway shown by the dotted lines in Figure 6 relatively to the vertically positioned fruit splitting blades hereinafter described.

*Driving Mechanism for the Central Vertical Shaft of the Machine*

As shown in Figure 4, the horizontal shaft 20 has keyed thereto the bevel gear 118 which meshes with a second bevel gear 120 on the vertical shaft 122 having bearings 124 in the main frame of the machine. This vertical shaft 122 carries on its lower end a horizontally disposed pinion 126 meshing with an intermediate gear 128 mounted on a stud shaft 130 having bearings in the main frame. This intermediate gear 128 meshes with a third gear 132 pinned on a central vertical shaft 134. This shaft has a lower bearing 136 carried by the lower frame portion of the machine and likewise has an upper bearing 138 (see Figure 1), which is suitably supported by rods 140 connected to the four corners of the uprights 2, 4, 6 and 8. This central shaft has a plurality of functions. It provides a driving mechanism for the spreader blade wiping mechanism hereinafter described. It also, through appropriate mechanism, opens and closes fruit splitting blades. In addition, through appropriate mechanism, it operates the fruit spreader blades and the fruit holding clamps which cooperate with the spreader blades.

*Driving Mechanism for Main Fruit Holding Turret*

Centrally of the main frame of the machine is located a turret which is provided with a plurality of spaced apart holders for receiving and holding fruit. Particularly the turret is provided with a plurality of spaced apart cup-like holders into which half fruit, in the present instance half peaches, are deposited from the splitting mechanism and the fruit spreaders which transport the split halves into the fruit cups.

The fruit turret intermittently transports the cups from the half fruit feeding station, such, for instance, as A, shown in Figure 34, and at which station the half fruits are deposited one in each cup with the cut face of the half fruit exposed, to a second station, such as B (Figure 34), at which station peeling mechanism cooperates with the half fruits in the fruit holders to peel the half fruit. Subsequently the half fruits in the holders are transported to a station C where the peeled and pitted half fruits are discharged therefrom, leaving the peelings in the fruit receivers or cups. Next, the cups with the peelings therein are transported by the turret to a station such as D (Figure 34), where the peelings are scavenged from the cups, where by the next movement of the turret these cups are transmitted by such movement back to station A where additional pitted half fruits are deposited by the spreader mechanism hereinafter described.

At the station A and operating in cooperation with the movements of the fruit cups which operate in spaced pairs, is mechanism which receives the whole fruit from the whole fruit holder 102 and splits or severs the flesh of the fruit preferably along the suture plane thereof and substantially simultaneously therewith grips the pit. The spreader mechanism then functions to transport each half pitted fruit which is thus split by the splitting mechanism into a fruit receiving cup.

Cooperating with each spreader mechanism is means for holding each half fruit on the spreader mechanism during the movement of the spreader mechanism from the fruit splitting mechanism to each fruit receiving cup. In addition, mechanism is present at this station A for operating the fruit splitting mechanism in such a manner that as the split is formed through the flesh of the fruit, the pit of the fruit will be passed into position between portions of the fruit splitting mechanism in such a manner that the pit will be gripped and held while the spreader mechanism moves each half peach away from the held pit and conveys the same to the fruit receiving cups.

Inasmuch as the present machine is illustrated for operation on freestone peaches, the separation of the held pit from each severed half of the peach is carried out with great rapidity and facility and without any appreciable tearing of the flesh of the peach halves. In addition, mechanism is present at this station A for removing loose pits or bits of fruit flesh from the spreading mechanism so as to prevent clogging or improper positioning of the fruit halves on the mechanism which transports the fruit halves from splitting position to the half fruit receiving holders.

In order to carry out the foregoing functions, the vertical shaft 122, shown in Figures 4 and 5, has keyed on its upper end a Geneva disc 142 carrying the usual Geneva roller 144, which cooperates with the usual type of slotted Geneva wheel 146 keyed as at 148 at the bottom of an elongated vertically disposed sleeve 150 concentrically surrounding the central vertical shaft 134. The upper portion of this sleeve 150 is provided with an enlarged collar 152, which collar is provided with a circular platform 154 to which is bolted as at 156 a spider-like frame 158 (see also Figure 6), carrying a plurality of half fruit receiving and holding holders herein specifically shown and illustrated as half fruit cups. These cups are arranged in four pairs about the periphery of the turret. The cups of each pair are disposed parallel with relation to each other. In other words, they are not disposed radially of the turret and as the cups are intermittently positioned at station A by the turret mechanism when they come to rest, a pair of cups is positioned so that each cup is an equal distance on opposite sides of a line passing centrally through the whole fruit receiving holder 102 as it arrives at its innermost position corresponding to the inward feeding movement of the whole fruit to the fruit splitting mechanism.

This, of course, also means that the two fruit receiving cups of the pair at station A are positioned on opposite sides of a line passing centrally through the fruit splitting mechanism and the fruit spreading mechanism when the fruit splitting mechanism is in a position juxtaposed to the fruit splitting blades.

Also, in the present machine, when a pair of cups is positioned at station A or any other particular station, the cups then remain stationarily at such station and while thus stationary, the fruit processing mechanism of that particular station and in fact all stations immediately becomes operative to carry out the particular processing function of that station and in fact for all stations. Thereafter, the fruit processing mechanism will then swing out of the way and the turret will resume the transportation of a pair of cups to the next particular fruit processing station and at the same time will bring a pair of empty cups into position at station A, which is the station at which a fresh pair of fruit halves will be deposited into a pair of cups.

The construction and operation of the half fruit receiving cups is in accordance with the teachings of Ewald Patent No. 2,255,049, of September 9, 1941, except that the contour or shape of the fruit cups themselves in the present instance are designed for receiving and holding half peaches, as distinguished from the shape of the fruit cup of said Patent No. 2,255,049, wherein the fruit cups are constructed for receiving and holding half pears.

In Ewald Patent No. 2,216,165, of October 1, 1940, the cup mechanism per se is shown as designed in shape and construction for receiving half peaches. Therefore, the shape of the cups in the present machine would more closely resemble the shape of the cups in the latter Ewald patent, No. 2,216,165. It is to be understood, however, that the mechanism of the present machine, insofar as it functions to operate on peaches is concerned, differs from the mechanism of Patent No. 2,216,165, which latter patent is likewise designed for processing peaches.

Immediately above the top of the turret and disposed centrally thereof and surrounding the central vertical shaft 134, as shown in Figure 4, is a stationary sleeve 160. Within the upper and lower portions of the bore of this sleeve 160 are located upper and lower bearings 162 and 164 (see Figure 12), which support the central vertical shaft 134 hereinbefore described. This shaft is supported in spaced relation from the stationary concentrically surrounding sleeve 160.

Returning now to the description of the sleeve 160, as shown in Figures 11 and 15, on a lower portion thereof it is provided with an integral mounting 166 carrying an integrally forwardly projecting smaller block-like mounting 168. This latter mounting has spaced threaded holes 170 adapted to receive elongated bolts 172 by which a bearing block 174 is rigidly mounted on the lower portion of this sleeve 160.

This block or mounting 174 is provided on its top surface for the full depth of the top with spaced half bearings 176.

A cap 178 provided on its under-surface with complementary half bearings 180 is bolted onto the top of block 174 by means of the bolts 182 passing through registering bolt holes 184 into corresponding bolt holes 186 in the block 174. Mounted in the half bearings 176 and 180 formed by the block 174 and cap 178 are a pair of parallel shafts 188 and 190 (see Figures 7 and 13). Each one of these shafts carries on its outer end and arm 192 on which is mounted a spreader blade for transporting the split half peaches from the splitting mechanism and for depositing the half peach into a half peach receiving cup, as hereinafter described.

Referring again to Figure 11 and likewise to Figures 12 and 15, the upper end of the stationary sleeve 160 is provided with integral spaced apart lugs 194 and 196, each carrying on its outer face spaced threaded openings 198 and 200. The vertical space between these lugs 194 and 196 provides a vertical way for guiding a vertically reciprocating bar 202 about to be described and shown in Figure 18.

In addition, the sleeve preferably directly opposite the lugs but on diametrically opposite sides of the sleeve is provided with a laterally extending block-like mounting 204 provided with spaced threaded openings 206 (see Figure 11) formed in one face thereof. This mounting 204 is arranged rigidly to carry a bracket 208 (see Figure 11) which bracket has at its two ends upstanding arms 210 and 212, the free ends of which are provided with two circular mountings 214 and 216 appropriately apertured as at 218 to receive a stationary shaft 220 (see Figures 12 and 17). The bracket 208 is provided with bolt holes 222 which register with the bolt holes 206 of the mounting 204 whereby spaced bolts 224 rigidly hold the bracket in position on the mounting 204 of the sleeve 160.

Additional means is provided for supporting the central sleeve and also for supporting the arms 210 and 212 of the bracket 208 and the stationary shaft 220 carried thereby. This means comprises a pair of arms 226, 228 (see Figures 13 and 11). Each arm is elongated and is provided on its front with an upstanding boss 230. The rear portion of the arm is provided with a vertical bore 232 to receive bolts 234 which pass likewise downwardly into threaded bores 236 and 238 in the bearings 214 and 216 for the shaft 220.

In addition, as shown in Figure 13, the bosses 230 of these arms 226 are provided with a forward horizontally disposed fitted opening 240 which receives these bolts 242 and 244, which bolts pass through a horizontal bracing or connecting bar 246 in turn connected to the uprights 2 and 8 at the corner of the stationary frame structure of the machine.

Referring again to Figure 11 of the drawings, and also to Figure 15, the sleeve 160 below the level of the mounting block 204 thereon is provided with a longitudinally extending guideway 248 which is formed by upper and lower spaced blocks 250 and 252, thereby to provide a vertical way or guide extending longitudinally of and parallel to the central axis of the sleeve 160, as best shown in Figures 15 and 17.

As shown in Figures 11, 12 and 15, a bar 254 is slidably mounted in this vertical guideway for reciprocation longitudinally of and parallel to the central vertical axis of the sleeve 160. A pair of plates 256 and 258 are fastened by bolts 260 and 262 into threaded openings in these blocks 250 and 252 whereby to hold the bar 254 reciprocably in the guideway above mentioned. As shown in Figures 12 and 20 the slidable bar 254 has bolted thereto as at 264 a bracket 266 which extends laterally therefrom and is provided with an offset section 268 which is offset at right angles thereto, which section is in turn provided with another offset section 270 likewise offset at 90 degrees to the section 268. The junction of these offset portions is provided with a threaded bore 272.

The offset section 270 forms a T-head 274. This T-head provides an elongated abutment which in depressed position engages the rollers 276 and 278 (see Figures 14 and 16) which are laterally mounted on a collar 280 and 282, each one of which collars is mounted upon shafts 284 and 286 journalled in the top portions of the bars 192.

To this end the upper portions of these bars 192 are each provided with a suitable opening into which the ends of the shafts 284 and 286 are inserted and screws 288 and 290 pass through the spreader plates 292 and 294 and into a threaded opening in the shafts 284 and 286. In addition, there are two other screws 296 and 298 (see Figure 12) in each spreader blade which threadedly engage each one of the bars 192 whereby rigidly to mount each spreader blade upon one of the bars 192.

In this manner when the vertically reciprocating bar 254, shown in Figure 15, is operated, it in turn through the elongated bracket 274, shown in Figure 19, will move down to depress the rollers 276 and 278 and lift the clamping bars 308 and 310. On the outer ends of the shafts 284 and 286 (see Figure 16) there are pinned collars 300 and 302, to one end of which as at 304, is affixed one end of the coiled springs 306, the opposite end of which springs are fixed in the collars 280 and 282 whereby the springs have certain action herein to be described.

Upon each collar 280 and 282 there is a laterally projecting clamping bar 308 and 310, which clamping bar is normally spring pressed to position shown in Figure 9 that is, in a downward direction relatively close to the side walls of the spreader plate.

Each spreader plate is preferably formed of sheet metal as shown in Figures 7, 8 and 9. Each one of these spreader plates is of generally rectangular shape and is provided along its top edge with an outwardly extending flange 314 and an outwardly extending bottom flange 316 and 318.

On each one of the bottom flanges 316 and 318 there is superimposed an elongated bar or ledge 320 and 322, the outer end of which is curved downwardly as at 324 for the purpose of guiding the peach in its inward movement so that it will rest on top of this bar.

The central portion of the main wall of each spreader plate is provided with an enlarged opening 326 and 328 which extends backwardly toward the rear portion of the sheet so that when the spreader plates are in position shown in Figure 7, that is, juxtaposed to the exterior opposed faces of the fruit slicing knives, the slots 326 and 328 will expose the meeting edges of the slicing knives as hereinafter set forth.

When a peach or other fruit has been placed upon the bars 320 and 322, as shown in Figure 25, the abutments 274 will have been raised out of contact with rolls 276 and 278 (see Figure 6) whereby to permit the coiled springs 306 (see Figure 7) to depress the clamping fingers 308 and 310 into contact with the upper peripheral opposed surfaces of the half fruit as it lies upon the opposed bars 320 and 322 with the pit of the peach held in the jaws of the slicing knives as hereinafter described. Thus, the half peach will be firmly held on the outside opposite faces of each spreader plate. Of this more will be said later.

The threaded hole 272 in the bracket 266 (see Figures 12 and 20) receives a threaded screw 330 and an adjusting nut 332. The head of this screw is adapted to engage an arm 334 carried by a sector 336 pivotally mounted as at 338 on a bracket 340, the shank 342 of which is bolted to the block 174 by means of bolts 344 (see Figures 10, 14 and 20). The sector 336 in the front has a notch 346 (see Figure 19) formed therein into which a blade 348 is inserted and rigidly held therein in any suitable manner as by welding, screwing or otherwise.

By reference to Figure 20 it will be seen that a threaded pin 350 carrying a bearing section 352 and a head 354 is inserted through a bore 356 in the sector 336 into a threaded opening 338 in the bracket 340, whereby the sector 336 may pivot about the sleeve 352 as an axis.

In addition, as shown in Figure 20, the sector 336 is provided with teeth 358 which engage with corresponding teeth 360 in a second sector 362 which is likewise pivoted about the sleeve portion 364 and the threaded pin 366 having a head 368 engaging through the bore 370 of the sector 362 and into the lower threaded opening 372 of the bracket 340, whereby the lower sector is pivotal around the sleeve 364. This sector 362 is provided with a lower extension 374 in opposition to the upper arm 334. Each one of these sectors is provided with a spring guide for holding a coiled spring 376 therebetween.

The sector 362 likewise has a slot into which the lower slicing knife 380 is permanently inserted. The spring 376 is arranged normally to force the blades 348 and 380 toward each other. However, this action is counteracted when the adjusting screw 300 upon reciprocation of the bar 254 moves the pin downwardly and contacts the upper inwardly extending arm 334 against the action of spring 376 and through the interconnecting gear 358 and 360 shifts the cutting blades 348 and 380 to open position, as shown in Figure 23.

The means for vertically reciprocating the bar 254 comprises a circular cam 382 (see Figure 15) which is pinned as at 384 to the vertical shaft 134. This cam on its undersurface has a contour which operates against a cam roller 386 to push the bar downwardly. Due to the action of the spring 376 in contacting the screw 330 on the bracket 266 on the lower end of the bar, the bar is returned to upward position.

*Mechanism for oscillating the fruit spreading blades*

Means is provided for oscillating the fruit spreader blades whereby to shift them from a position in which the half peaches are mounted and held thereon to a position wherein each half peach is disposed simultaneously in a pair of spaced apart, juxtaposed cups, and after which the half peaches are released from the spreader blades and are then returned back to the first position to receive additional split peach sections. In the half peach depositing operation, each whole peach is severed along a plane which is parallel to and substantially coincides with the suture plane of the peach. Thereafter each half peach is laterally and arcuately shifted bodily downwardly so as to position the curved wall of the half peach into a receiving cup in such a manner that the similarly parallel curved surface of the half peach is deposited upon the inner walls of the alternately grooved and ribbed cup sections which are located with the juncture line of the two cup sections parallel to the splitting blade as shown at station A in Figure 34. The means for oscillating the fruit spreader blades comprises a relatively circular cam 388 keyed as at 390 to the shaft 134. This cam has a cam track 392 in which operates a cam roller 394 mounted at the top of a relatively long vertically disposed bar 396 which bar is at its lower end adjustably connected as at 398 to a second vertically elongated bar 400 (see Figures 10 and 15).

As shown in Figure 15 this bar 400 has formed on its inner lower face a series of teeth 402 which mesh with teeth 404 on a sector 406 which is mounted on the inner end of the shaft 188 (see Figures 7 and 15). The bottom end of this bar 400 has bolted thereto as at 408 a spacing block 410 to which is likewise bolted as at 412 a shorter bar 414, the upper end of which as at 416 has teeth which engage with teeth 418 on a second sector 420 mounted on the inner end of the shaft 190 (see Figures 7, 14 and 15) whereby upon vertical reciprocation of the bar 396 and its connected bar 400 the two racks are operated in the manner described to oscillate the shafts 188 and 190 about their axes, whereby likewise to oscillate the arms 192 on the ends of these shafts to shift the spreader plate about the axes 188 and 190 from a normal vertical position, as shown in Figure 7, wherein they are juxtaposed and in contact with the opposite exterior sides of the upper and lower vertically disposed slicing knives or blades 348 and 380.

*Means for opening the clamping bars to release the half fruit into the fruit cups*

Means is provided at the discharge position of the spreader plates 292 and 294 as shown in Figure 8 in which position they are horizontally positioned directly over the fruit cups, as shown in Figure 13, to release the fruit clamping bars 308 and 310.

In the present instance this comprises a bracket 422 (see Figures 7 and 8) which, as shown in Figure 14, is bolted (see Figure 30) to the vertically rising and falling peeling head 460 as at 462. This bracket 422 is designed so as to be positioned below the horizontal position of the spreader blades 292 and 294 in the position in which they are shown in Figure 8. The extreme left hand end 464 of the bracket 422 is horizontally disposed and is provided with a threaded opening in which a bolt 466 is screwed. This bolt takes through an elongated slotted opening 468 in a horizontal portion 470 of a cam 474, has an inner diagonal face 476 which is adapted to contact the roller 276 of the peach clamping device 308. In addition, as shown in Figures 14 and 30, the peach peeling head 460 is provided with a threaded bore 478 receiving a bolt 480 passing through an elongated slot 482 in a bracket 484 having an upstanding finger provided with a cam surface 486 (see Figure 14) which directly lies in the path of the roller 278 of the clamping finger 310, whereby as the spreader blades each carrying a half peach on its outside surface and held firmly thereon by the lower edge of the peach resting upon the ledges 320 and 322 and the upper edge of the peach gripped as shown in Figure 9 by the clamps 308 and 310, descends to horizontal position, the clamping blades will remain in clamping position until the peeling head 460 rises sufficiently so that the cam surfaces 476 and 486 on the bracket 422 contact the rollers 276 and 278 of the clamping fingers whereby to release the clamps 308 and 310 to cause the half peaches to drop into the cups, as shown in Figure 13, before the spreader blades 292 and 294 start their vertical swing upwardly.

In short, the clamping fingers are released by means which moves prior to and independently of the upward movement of the spreader blades. The adjustment slots of the cam fingers 474 and 484 permits an adjustment for timing the releasing of the half peaches from the spreader plates relative to the time of upward movement of the spreader plates themselves.

The fruit halving and pitting mechanism

Means is provided in association with the inward feeding movement of the whole peach and the whole fruit feeding holder 102, for severing the flesh of the peach preferably through the suture plane of the whole peach or on a plane parallel to and closely adjacent the suture plane of the peach and likewise for slicing through the flesh of the fruit so that the line of severance follows closely the border line of the pit and without contacting the hard surface of the pit, whereby to maintain the sharpness of the flesh cutting blades and in a manner such that the flesh cutting blades themselves act as gripping means for receiving the pit therebetween and for firmly gripping the pit, preferably on opposite sides of the ridged portion of the pit so that when the spreader blades, which during the cutting operation are positioned adjacent the line of cut of the flesh of the fruit and between the cut halves are spread oppositely away from each other or are in a sense opened, the spreader blades will force the two halves simultaneously away from the held pit of the freestone peach without tearing the flesh or otherwise disfiguring the flesh at the cavity of the pit and will then deposit the severed halves into the fruit receiving cups.

In the present illustrated embodiment of the invention, the flesh severing blades 348 and 380 are provided on their front ends with cutting edges 426 and 428. The cutting edge 428 of the lower blade is formed on a diagonal relative to the path of movement of the whole peach as it is fed by the fruit holder 102.

In addition, the upper cutting edge 426 is on a reversely disposed diagonal relative to the path of movement of the peach so that these two cutting edges make a slicing cut through the flesh of the whole fruit. Figure 22, for instance, shows the position of the whole peach as the front thereof passes inwardly across these diagonal cutting edges 426 and 428. It likewise shows the entering end 430 of the pit itself as having hollow ridges at the innermost ends 432 and 434 of these diagonally disposed slicing edges 426 and 428. In this position (Figure 22), the upper cutting blade 348 and the lower cutting blade 380 had started to move outwardly so as to provide a greater opening between the lowermost portion 432 of the front edge of the upper cutting blade and the portion 434 of the front cutting edge 428 of the lower cutting blade 380.

Figure 23 shows a position such that the blades 348 and 380 have moved to an even greater relatively open position. In this position the whole peach and its pit have advanced still farther. It will be noted that the cutting edge 436 at the bottom of the front slicing edge 426 is formed diagonally upwardly and thence is for a short distance formed slightly downwardly as at 438 at which point it is then formed inwardly upwardly as at 440 and merges with a series of downwardly depending inwardly formed saw-like teeth 442. The lower blade 380 beginning at the line 434 thereon is formed for a short distance diagonally inwardly and upwardly as at 444 and thence for a short distance as at 446 is tapered substantially horizontally and thence is cut downwardly as at 448 to join a series of bottom saw teeth 450 which act in opposition to the upper saw teeth 442.

By reference to Figure 7 it will be noted that the edges 436 and 444, which in Figure 7 are brought together, lie in a common vertical plane. In short, these edges are not laterally staggered relatively to each other. They do not overlap and this is likewise true of the front cutting edges 426 and 428 and also of the edges 438 and 446.

As shown in Figure 23 by the position of the pit and the cutting blades 348 and 380, it will be seen that the cutting surface 444 by reason of its rearwardly inclined taper is arranged to follow the lower peripheral contour of the pit as the pit moves somewhat arcuately toward a position between the saw teeth 442 and 450. In this position the blades are still moving in opposite directions toward a more open position.

In Figure 24 it will be noted that in the cycle of movements the blades 348 and 380 have now started to approach one another so as to follow the converging contour of the rear portion of the pit as it moves inwardly between the blades and in this position the cutting edge 438 and the portion 446 of the upper and lower blades are shaped so as to follow this converging contour as the blades come together and as the pit moves inwardly.

The pit will continue to move inwardly and the blades will continue to come together until the portion of maximum diameter of the pit contacts the upper and lower saw teeth against the tension of the spring means 376 which is tending to close the blades one upon the other. Hence the pit is resiliently gripped and held by the upper and lower saw teeth. At the same time the front cutting edges of the blades have sliced around the rear end of the flesh of the incoming peach closely following the contour of the pit thereof and without actually contacting the hard pit.

Figure 26 shows a pit held between the upper and lower saw teeth. These teeth are ground so that the alternate teeth are beveled in opposite directions. For instance tooth 442a are beveled in one direction while the next adjacent teeth 442b are beveled to face in just the opposite direction. This produces a tooth structure cooperating with the suture ridge of the pit in the manner shown in cross-section in Figure 9 wherein the adjacent teeth 442a and 442b lie on opposite sides of or straddle the suture ridge of the pit. This same construction is present on the lower teeth 450a and 450b.

Thus, by grinding the saw teeth alternately, oppositely beveled, but still lying within the planes of the saw blades 348 and 380, a firm gripping of the pit is provided since the saw teeth alternately lie on opposite sides of and grip portions of the pit laterally of the suture ridge of the pit. Hence, the pit is firmly held from lateral movement and particularly is it thus held during the time that the spreader blades engaging behind the cut surfaces of the half peaches, subsequently move outwardly in opposite directions to separate the peach halves from the held pit.

By reference to Figures 24 and 25 it is to be explained that the upper and lower blades 348 and 380 extending from the inner terminal point 452 of the upper saw teeth and the lower terminal point 454 of the lower saw teeth, to the respective inner ends of the upper and lower blades such as the blade edge 456 and 458 all lie in a common vertical plane.

It is to be noted by reference to Figures 7 and 9 that when the spreader blades 292 and 294 shift to a vertical position, they are positioned as shown in Figures 7 and 9 with their vertical faces directly contacting the vertical opposed outer faces of the two slicing blades 348 and 380 so that as the whole peach is fed forwardly as for instance in Figure 22 across the front cutting edges 426 and 428 of the upper and lower slicing blades the two then vertically situated spreader blades will enter the slicing cut formed by the front edges of the slicing blades and then as the peach continues to be moved rearwardly of the slicing blades as in Figures 23, 24 and 25, the cut halves will be passed on opposite sides of the exterior vertical surfaces of the spreader blades and the pit will enter the saw tooth opening between the slicing blades and the opening 326 of the spreading blades.

The spreader blades remain in downward or horizontal position as shown in Figures 13, 8, and 26, until some time after the cutting blades 348 and 380 have started their opening movement whereby to release the grip of the saw-like teeth or other pit holding means carried by these blades from the pit so that the pit will fall downwardly free of the teeth and in the majority of cases onto the faces of the spreader plates which are opposite to the facial portions thereof which carry the fruit halves.

In certain instances it may be possible that the saw teeth of either of the upper or lower cutting blades 348 and 380 may sufficiently penetrate the pit so that the pit will adhere to one or the other of the upper or lower sets of teeth, in which case the pit will remain in the position shown in Figure 26.

*Pit ejecting and spreader blade wiping mechanism*

Means is provided for not only positively removing any pit which adheres to the tooth members of the cutting blades 348 and 380 and/or for also sweeping off or cleaning the reverse surfaces of the spreader plates when the latter are in their downward or horizontal position, whereby all refuse is removed from the cutting and pitting mechanism before the next slicing and pitting action and spreader plate action takes place.

In the present instance the shaft 220 has loosely mounted thereon a relatively long sleeve 488 (see Figures 17 and 18), one end of which preferably integrally carries a pinion 490. The opposite end of this sleeve 488 carries a keyway 492 to which is splined a hub 494 on which a tooth segment 496 is integrally formed. The teeth of this segment mesh with the teeth 498 on an elongated rack bar 500, whereby the rack bar is reciprocated by means of the tooth segment.

Means is also provided for oscillating this rack bar during its reciprocation whereby two distinct movements are imparted to the rack bar. The rack bar 500 at its bottom carries a bifurcated yoke 502 (see Figures 12 and 19), the two furcations 504 and 506 of which have attached thereto as at 508 and 510 two spaced flexible metal plates 512 and 514, to the bottom edges of each of which are suitably clamped by screws or the like two rubber wiping blades 516 and 518.

As shown clearly in Figure 13, the rubber wiping blades 516 and 518 lie on opposite sides of the vertically disposed slicing blades 348 and 380. In short, the rack bar carrying the bifurcated yoke 502 having the wiping blades 516 and 518 on its bottom spaced apart portions straddles the vertical plane of the slicing blades and is oscillated in this plane when the spreader plates are in their down or horizontal position after this wiping motion which carries the rubber wiping plates across the upper top faces of the spreader blades in the down position, forwardly and, backwardly thereof, when the rack bar has moved upwardly to clear the upward movement of the spreader blades.

Figures 26 to 29 show the wiping movement of the yoke 502, and Figures 28 and 29 show the manner in which the wiping bars 516 and the rack 500 are raised so as to permit the spreader plates to move to their upward vertical position juxtaposed to the slicing blades. The bifurcated yoke 502 is bolted to the bottom of the rack bar 500 by means of the bolts 520 which pass through appropriate holes 522 in the yoke (see Figure 19) and in like manner the flexible blades 512 and 514 are bolted to the bottom of the yoke 502 by means of bolts 524 and 526.

Means is provided forming a guideway for the reciprocatory movement of the rack bar 500. This is shown in Figure 11 as comprising two substantially circular spaced apart bearings 528 and 530, as shown in Figures 17 and 18. These are loosely pivotally mounted on the shaft 220 and they have integrally formed therewith a connecting yoke 532 formed with the guideway 534 in which the rack bar 500 is adapted vertically to reciprocate.

Means is provided for rotating the pinion 490 on the shaft 220 comprising a cam 536 keyed as at 538 to the vertical shaft 134 (see Figure 12), which cam has a cam-way 540 in which is disposed a cam roller 542 carried upon a slotted plate 544 (see also Figure 10) having a central opening or slot 546 which receives the shaft 134, whereby to guide this plate in a horizontal reciprocatory motion. One end of this plate has bolted as at 548 a rack block 550 having teeth 552 on its under-surface engaging with the teeth of the gear 490, whereby on rotation of the shaft 134 the slide 544 is reciprocated to alternately rotate the gear 490 whereby to oscillate the rack 500 vertically in its slide 534 as hereinbefore described. The outer end of the slide 544 is guided in a slide-way formed in the upper bracket 554 as shown in Figure 11. This bracket 554 is rigidly attached as at 556 to the main frame of the machine (see also Figure 10).

Likewise attached to the under-surface of bracket 532 is a smaller bracket 558 (see Figure 11) which carries a lug 560 having a perforation into which is threaded as at 562 a pin 564. This bracket 558 is secured to the block 532 by means of the bolts and the pin is secured in the opening of the lug 560 by means of a nut 568, see Figure 17.

The vertical shaft 46 shown in Figures 1 and 3 in the corner of the standard is provided near its upper end with a collar 570 pinned thereto (see Figures 13 and 17), which collar has a flat portion to which is bolted as at 572 a plate 574 carrying spaced rollers 576 and 578 on the studs 580 and 582. These rollers receive therebetween the pin 564 (see Figures 13 and 17) which depends from the bracket 558 on the block 532 (Figure 11). Therefore, in the oscillation of the shaft 46, due to the reciprocation of the slide 36 by the cam mechanism 24 (see Figure 2), the two rollers likewise oscillate the pin back and forth whereby to rock the bracket 532 forming the guide for the rack bar, about its axis 220, whereby to reciprocate the wiping mechanism carried by the bottom of the bar while at the same time not interfering with the raising and lowering movement of the wiping mechanism due to the operation of the segment 496 which cooperates with the teeth 498 on the rack bar.

In the operation of this wiper bar mechanism it will be seen that the combination of the vertical movement of the rack bar and the oscillating movement of the rack bar due to the rollers operating upon the pin 564 and shifting the carriage 532 about the axis 220, there is produced the following movement: the edge of the wiper 516 contacts the upper surfaces of the two separator blades 292 and 294 in their down horizontal position. The wiper mechanism 516 thus sweeps forwardly across each horizontal separator blade whereby to clear it of pieces of peach flesh and pits.

When the wiper blade has completed its movement across the face of the spreader plates (see Figure 27) it then raises due to the reversing movement of the pinion and segment 496. The raising of the wiper blade is accomplished by the reversing of the segment gear as stated, but the reverse backward movement from the position shown in Figure 27 to the position shown in Figure 28 is caused by the action of the roller 576 and the pin 564 (see Figure 17).

During this movement the wiper mechanism has been carried backwardly toward the rear portions of the cutting blades and spreader plate mechanisms but in a position clear thereof and overlying the same. In this position the next movement of the rack bar mechanism is to bring the wiper bars downwardly toward the spreader blades. However, in the meantime the spreader plates will have moved from a vertical position, in which position fresh peach halves have been deposited by the whole peach holder 104 so that when the spreader plates move downwardly to horizontal position the wiper blade will in timed relation therewith be moved downwardly upon the rear portions of the spreader plates and then will sweep forwardly across the top faces thereof to clean the same of any foreign matter and any pits.

*The peeling mechanism*

With reference to Figures 30, 31, 32 and 33, and particularly to Figure 34, after the severed and pitted peach halves have been dropped in the pair of cups underlying the peach feeding station, and the spreader blades have been lifted to clear the peach cups, each containing a half peach, the turret then makes its next intermittent movement whereby to carry the two peach halves to the peeling station B (see Figure 34). The peeling head, mounted for vertical movement relatively to the peach halves in the cups, at this station and as heretofore mentioned in connection with Figure 1 of the drawings, is vertically reciprocated by the slide 28. As shown in Figure 1 this slide, through a vertical adjustment 584 hereinbefore described in connection with certain Ewald patents, serves adjustably to operate the main vertically reciprocable peach peeling slide 726 which slides in opposed guideways 728 and 730 mounted on opposed corner posts 2 and 4 of the frame and hereinafter referred to. The vertical corner shaft 46 carries at its upper end a link 592 (see Figures 17 and 34) connected by a pin 594 to a universal connection 596 in turn connected to an adjustable link 598, which link at its opposite end has another universal connection 600 connecting with a drive pin 602 which is mounted on the upper end of a lever 604 (see Figures 1 and 34).

This lever 604 (see Figures 30 and 33) carries on its bottom portion a collar 608 adapted to swing about a horizontal shaft 606. This collar in turn carries a toothed sector 610 which gears with two pinions 613 and 614 rotatably mounted on the main peeling carriage 460.

The horizontal shaft 606 extends rearwardly and has on its opposite end a collar 616 which carries a toothed sector 618 meshing with a similar pair of pinions 620 and 622. These pinions 613, 614, 620 and 622 are mounted on stud shafts 624 and 626 carried on the peach peeling carriage 460.

The inner ends of these shafts 624 and 626 carry blocks 628 and 630 to which are connected as at 632 and 634 the peeling knife 636 of arcuate conformation suitably shaped to peel the type of peach desired, in the present instance the freestone type of peach. The forward edge of this knife is suitably beveled and sharpened for this purpose.

It will thus be seen that the knife is driven from both ends. The peeling carriage likewise carries means for retaining the half fruit in the fruit cup during the peeling operation whereby to prevent it tilting laterally as the peeling knife passes through the flesh of the fruit to make the paring cut and in addition carries means for preventing the adhesion of the peeling pad or means that prevents the half peach from tilting in its cup with the cut face of the half fruit when the peeling carriage is lifted away from the face of the half fruit. This mechanism is preferably of the construction shown in Ewald Patent No. 2,242,243, issued May 20, 1941.

The peach peeling carriage is provided at its upper end with an upstanding plate-like bracket 638 which is horizontally disposed and is of substantially oblong shape (see Figure 34). A pair of peach peeling pads is mounted for vertical reciprocation on and relatively to this plate 638 and each pad is adapted to directly overlie and cooperate with a fruit receiving cup and with a peeling knife which is adapted arcuately to swing through each cup.

This plate 638 also provides opposed bearings 640 and 642 for the shaft 606, hereinbefore mentioned. These bearings are bolted as at 644 and 646 to the top of the plate. As hereinbefore mentioned the two ends of these shafts carry the two sectors 610 and 618 and are simultaneously driven by the lever mechanism 604 and 602 from the corner vertical shaft 46.

Each one of the sectors 610 and 612 meshes with and drives the pair of gears 613 and 614 and 620 and 622, which gears are mounted in pairs on the opposite ends of the knife oscillating shaft and by means of which two pairs of peeling knives are driven simultaneously and at both ends thereof.

It is understood that in the present arrangement the peeling head is vertically reciprocable and is brought down upon a pair of cups to position two peeling pads, one directly upon the cut face of the fruit in each cup and at the same time the peeling head also positions two peeling knives directly at the mouth of the cup in position so that when the peeling knife is arcuately movable it will swing through a cup. These will be two knives swinging simultaneously through two cups in association with the two pads.

As before stated there are a pair of pads 648 and 650 for each cup. These pads are adapted to be positioned against the cut face of each half fruit while in its cup so as to prevent the half fruit from tilting laterally in a cup as the peeling knife passes through the flesh of the fruit while held in the cup. Each pad mechanism comprises an upstanding bracket 652 bolted as at 654 to the top of the plate 638.

This bracket has at its upper end a laterally extending horizontal arm 656 having a threaded opening 658 through which passes a threaded bolt 660 having a knurl head 662. In addition, there is a locking nut 664 which threadedly engages the threaded bolt 660 to hold it in any adjusted position. The bottom of the bolt 660 seats into an opening in a spring collar 666, around which coils the upper end of a coil spring 668. The bottom of this spring is adapted to coil around a vertically disposed sleeve 670, which sleeve 670 is mounted in a sleeve-like bearing 672, in turn mounted in an elongated vertical bearing 674 in the plate-like top 638. A pin 676 engages a semi-circular bore in sleeve 670 and likewise in a pawl plate 678 whereby said pawl is held from turning with respect to the sleeve 670.

The outer end of this pawl plate 678 has a pawl 680 attached thereto as by means of a screw 682. The sleeve 670 is provided with a hollow interior 684 and terminates at its bottom in a substantially circular pad 648, which in cross sectional dimensions is shaped to conform to the cross sectional dimensions of the particular size of half peach to be processed in the machine, except that a margin or space is left between the peripheral end of the pad and the inner wall of the cup through which the peeling knife may swing.

Reciprocably mounted within the hollow interior of the sleeve 670 is a relatively long stem 686 which on its bottom end is provided with a relatively smaller circular pad 650. A collar 690 is pinned as at 692 to this stem 686 near the bottom thereof and a second relatively weaker coil spring 694 is confined between the collar and the upper end of the hollow portion of the sleeve 684, whereby the spring by engaging the collar tends normally to force the smaller circular pad 650 downwardly away from the under-surface of the pad 648.

When the peeling head is first brought down onto the cut face of a half fruit in a cup, the smaller pad 650 will be forced upwardly into the counter-sunk recess in the main pad 648 against the tension of the spring 694. Next, the main pad 648 will be brought into contact with the cut face of the half fruit, the spring 668 yielding. This will mean that the sleeve 670 will likewise yield upwardly and carry with it the pawl block 678. This means that the pawl 680 will likewise rise vertically.

Mounted on the pair of upstanding brackets 656 (see Figures 30 and 33) are a pair of bearings 696, in which is rotatably mounted a shaft 698. Mounted in spaced relation on the shaft 698 are two pairs of hubs side by side, each provided with a downwardly depending ratchet 702 having alternately staggered teeth which are adapted to be moved out of the path of the pawl 680. Means is provided at stated times for projecting the two ratchets into locking engagement with the pawl 680 in any desired position of vertical adjustment which the pawl 680 has been moved to due to the rise of the pad 648 contacting the cut face of the half peach so that when this means is operated the pawl will be locked in any such position so as to hold the pad firmly down in contact with the cut face of the half fruit.

The means preferred comprises a collar 704 (see Figure 31) pinned as at 706 on the shaft 698. This collar 704 carries a roller 708 adapted to cooperate with a cam 710 mounted on the shaft 606. The roller moves into engagement with the cam by reason of an arm 712 integral with the ratchet arm 702 on the shaft 698, between which and a cut-out 714 on the bracket 656 a coil spring 716 is confined. By reason of the foregoing when the pad 648 has been brought down into contact with the cut face of a half fruit and has been shifted upwardly by the variation in thickness of the half fruit in the cup the pawl 680 will be vertically adjusted relative to the two ratchets with the staggered teeth, whereby the pawl will move upwardly and thence in synchronized movement the shaft 606 through the cam 710 will operate the roller to rotate the shaft 698, which in turn with its connection with the two depending ratchet members will move the ratchet members inwardly so as to have the shoulders of the ratchet teeth thereon overlie the pawl 680, whereby to prevent any further upward movement of the pawl 680 and thus to hold the pad 648 in its vertically adjusted position.

This pad holding movement may be appropriately timed by the configuration of the cam to occur during any desired period during the peeling operation but it is preferred that the pad be locked after it has been adjustably raised to its desired height in accordance with the thickness of the half fruit in the cup and thereafter automatically to be locked in any such vertically adjusted position.

Upon the completion of the peeling operation the paring knife is shifted to a position out of the fruit cup and at the same time the peeling head is lifted out of engagement with the fruit and is returned to its raised position. During the raising of the fruit peeling head a suction is created on the main fruit pad engaging the wet flat sticky surface of the half fruit. Such suction, however, is broken by the smaller spring-pressed plunger contacting the flush of the fruit in the pit cavity.

In addition to the function of breaking any vacuum between the cut, sticky face of the half fruit and the main pad 648, the smaller pad 650 functions to contact the flesh of the pit cavity and to press downward on this flesh at the pit cavity so as to force the central portion of the flesh of the pitted half fruit firmly against the central inner wall portion of the fruit cup and thereby prevent this portion of the half fruit from being pushed upwardly toward the pit cavity as the peeling knife arcuately moves through the cup during the peeling operation. In addition, as shown in Figures 8, 14, 16, 22 and 30, as the peeling head moves upwardly away from the cut face of the half fruit the cam mechanisms 474 and 486 contact the rollers 276 and 278 to release the clamping members 308 and 310 from the half fruit whereby to permit the same freely to drop in the cup mechanisms. The curved periphery of each half fruit carrying the peel will be supported by the curved inner walls of each fruit cup and the cut face of each half fruit and the pit cavity thereof will be exposed and will lie in a horizontal plane so that on the next intermittent rotation of the turret, these two fruit cups each carrying a pitted half fruit therein will be presented to the peeling station B as hereinbefore described.

It will thus be seen from Figure 30 that with respect to the arcuate swing of each peeling knife, when each half peach is carried in a ribbed and grooved cup and shifted to station B, the swing of the knives will take place in a direction parallel to the planes of the alternate grooves and ribs upon the inner surfaces of the half cup sections so as to prevent not only bunching of the peelings in front of the knives during the peeling operation, but likewise to prevent chattering of the knives and also for the purpose of slightly wedging the peelings into the spaces between the ribs and thereby more firmly to hold the peelings in the cups subsequent to the peeling operation. The cooperative functioning of the knives in association with the internally ribbed and grooved articulated half cups is disclosed in the prior Ewald Patent 2,255,049, issued September 9, 1941, and except in association or combination with the combined operations of the present machine, including the fruit discharging operation wherein the movement of the discharging mechanism is in the direction across the ribs and grooves as distinguished from a direction parallel thereto, no claim is made per se to the peeling mechanism itself. Claims herein, however, are made to the combinations and subcombinations of operations, to wit, fruit dispositing, fruit peeling and fruit discharging operations, in association with the turret, the arrangement of the ribbed and grooved fruit cups thereon, and the sequential transportation of the cups to these different stations, and subsequently in combination with the direction of movement as specifically, the arcuate movement of the peeling knives and the fruit discharging means as related to the directional disposition of the ribs and grooves of the fruit cups as effecting the combination peeling and fruit discharging sequences and/or the combination of all of the various sequential fruit processing sequences.

The fruit discharging station

After the peeling has been accomplished, the turret again moves intermittently to carry the two half fruits mounted in their fruit cups, with the peeled and pitted half fruits therein, and with the loose peeling underlying each half fruit, to the next station, such as C (see Figure 14), at which station automatic means is provided for discharging each half fruit from its fruit cup while leaving the peeling in the cup. The present fruit discharging mechanism differs from that disclosed and claimed in the pending application of Raymond L. Ewald and Henry A. Skog, Serial No. 430,840, filed February 14, 1942, now Patent No. 2,388,682, Nov. 13, 1945, the same being a division of an application Serial No. 185,332, filed January 17, 1938, now Patent No. 2,280,813, April 28, 1942. In the present type of fruit discharging mechanism each half fruit is discharged in a very gentle manner so as to reduce to the minimum the possibility of bruising the fruit. Specifically, the half fruits, with relation to the turrets, are gently rolled on their axes in a straight line movement in a direction outwardly away from the turret as distinguished from the prior devices wherein either each half fruit is forcibly ejected and flung through the air with considerable violence, or alternatively is first rolled sidewise by a sudden impact of the ejecting mechanism, onto a hopper which thereafter and in synchronism then pitches the laterally thereon half fruit in a direction forwardly out of the turret. Furthermore, in the prior devices means was provided for positively engaging the edge of the loose peel in the cup during the discharging operation, whereas in the present device this is eliminated and the fruit discharging mechanism is arranged in its arcuate swing so as to move transversely with respect to the ribbed and grooved construction of the cup sections and in a manner so as to eliminate the necessity of providing means for engaging the edge of the peeling thereby positively holding the loose peeling in the cup. In short, the ribbed and grooved construction of the cup itself is utilized as a means for holding the loose peeling in the ribbed and grooved cup during the processing operation. Furthermore, in carrying out this function the discharging mechanism is disposed in a very simple manner at the discharging station and in a direction substantially tangential to the path of movement of the fruit cups and arcuately swingable about an axis disposed tangential thereto, as distinguished from prior constructions wherein the fruit discharging mechanism swung about an axis which was either radial of the turret or lay in a direction at right angles to a tangent of a circle formed by the arcuate movement of the fruit cups as they moved with the turret from station to station. Furthermore, by the use of the present type of fruit discharging mechanism the need of additional hoppers for receiving the half fruits from the fruit cups and the need for lifting the same clear of the fruit cups to prevent the movement of the turret is likewise eliminated.

The claims of the present invention, in addition to being drawn to the combination of the present type of fruit discharging mechanism with the internally ribbed and grooved fruit cups and in combination with such fruit cups and the peeling and/or other stations, are likewise directed to the fruit discharging mechanism per se and also to its details of construction. The present invention shows the discharging station at C for such machine for discharging the processed half fruits from the peach holding cups. It is to be understood that under certain situations the principles of the present invention are adapted also to discharging other types of fruit, it being understood that the cup would be changed slightly in shape to accommodate such other half fruit, as distinguished from a half peach.

The present fruit discharging mechanism is driven from the vertical corner shaft 46 and the linkage hereinbefore described, being connected to the upper end of the arm 604 which is adapted to oscillate the segmental gears shown in my prior pending application, Serial No. 440,034, and see also Ewald Patent No. 2,255,049, of September 9, 1941. Inasmuch as the peeling mechanism per se is not claimed in this present application, no further description thereof is deemed necessary. The fact, however, that a peeling mechanism is present to peel the fruit while held in the grooved and ribbed cups in a manner to leave the peeling in the cup, underlying the half fruit, is of importance in the present application in so far as the fact is concerned that the present discharging mechanism specifically is capable of operation to discharge the peeled fruit from the cup while the fruit overlies the peeling held in the cup, and still more specifically, the present fruit discharging mechanism is constructed to discharge the peeled half fruit from the cup without discharging the peeling therefrom, and in a manner to eliminate the necessity of employing means engaging the edge of the peeling at the mouth of the cup to hold the peeling in position in the cup during the half fruit discharging operation. In the present invention the discharging mechanism operates transversely of the alternate ribs and grooves formed internally on the inner walls of the cup, which alternate ribs and grooves serve to hold the peeling in normal position within the cup during the peeled fruit discharging operation, and furthermore due to the fact that the discharging mechanism operates across or transversely of these ribs and grooves in the cup. Therefore, in so far as the peeling operation is concerned, the fact that the half fruit has been peeled prior to the fruit discharging operation, and the further fact that the peeling severed from the half fruit and underlying it in the grooved and ribbed cup, does combine cooperatively with the fruit discharging mechanism of the present invention.

Referring now again to Figures 30, 34 and 37 and to the arm 604, the upper end of this arm is connected to a short link 705 through the instrumentality of the pin 602. The link 705 is provided with a threaded aperture into which threads an adjustable bolt 707 in turn threaded into a link 709 which is of somewhat similar construction to the link 705. This link 709 in turn is connected to an arm 711 through a pin 713. Arm 711 carries a segment gear 718 pivoted by a short shaft or pin 720, the pin being supported in a bracket 722 mounted on a ledge 724 which in turn is mounted on the peeling head plate 460 (see Figure 30) from which the peeling mechanism hereinbefore described is suspended. This plate 460 constitutes the upper transverse portion of a vertically operable slide 726 which slide reciprocates in the vertical ways 728 and 730. At its bottom the slide is provided with an adjustable connection 584 with the upper end of the vertically operating slide 28, as hereinbefore described, whereby upon vertical reciprocation of this slide 726 the peeling mechanism will be raised and lowered with respect the the fruit cups as hereinbefore set forth. In addition, as will be made evident, the half fruit discharge mechanism is likewise mounted rigidly with this slide and vertically moves, synchronously with the up and down movements of the peeling slide.

As hereinbefore described a series of half fruit receiving and holding devices herein specifically shown and illustrated as half-fruit cups 732 are arranged in four pairs about the periphery of the turret 158. The cups of each pair are disposed substantially parallel with relation to each other; in other words, they are not disposed radially of the turret. As these cups are intermittently positioned by the turret mechanism, when they come to rest a pair of cups is positioned so that a central axis of each cup, and particularly the longitudinal stem axis of each half fruit when positioned in the cup, is an equal distance on opposite sides of and parallel to a line passing centrally through the axis 134 and centrally through the fruit discharging mechanism at the fruit discharging station C and with the ribs and grooves lying transversely of said line. Thus, when a pair of cups is so positioned that the cups remain stationary at such station, and while thus stationary, the fruit discharging operation is carried on, and in fact all other processing is likewise carried on at other cups on the turret at other stations. In general, as shown in Figure 34, station A is the so-called feed-in station where half fruits are disposed in each of the cups 732. These half fruits, on the movement of the turret, are then moved to station B, where they are peeled by the peeling mechanism shown in general in Figure 30. Thereafter the cups containing the peeled half fruits with the skins severed therefrom and underlying the half fruits in the cup, are moved to the station C, which is the fruit discharging station forming the subject matter of this invention. Thereafter the same cups are moved to the station D at which the peelings are scavenged from the fruit cups, the half fruits having previously been discharged from the cups independently of the peelings. The details of the scavenging mechanism are shown in the Ewald Patent No. 2,280,813 except that the mechanism is duplicated and the scavenging paddles 1014 sweep through the cups in a direction parallel to the ribs and grooves and not at right angles thereto.

*The cup mechanism*

The cup mechanism, in so far as the general structure and operation of the cups is concerned, is disclosed in Ewald Patent No. 2,255,049, of September 9, 1941, except that in the present invention the cups are shaped as illustrated to handle peaches and therefore are of specifically different shape than that of Patent No. 2,255,049. However, the internal ribs and grooves, as shown in said patent, are likewise present in the cups disclosed and claimed in this application, and the arrangement of the cups in pairs is the same as that shown in the prior Patent No. 2,255,049, reference to which is made for a fuller disclosure of the ribbed and grooved construction, as well as to the manner of opening and closing the cup sections relatively to each other and their timed operation with respect to the peeling blade, the construction and operation of which is likewise disclosed in this said Ewald Patent No. 2,255,049. In addition to the functions set forth in the Patent No. 2,255,049, the alternate ribs and grooves 134 and 136 formed on the inner wall of the cups of the present application serve during the peeling operation somewhat to force the peeling as it is severed, into the grooves of the cup whereby to cause it more firmly to adhere to the inner walls of the cup so that during the fruit discharging operation about to be described the peeled half fruit can be discharged from the cup without disturbing the peeling, by means of the mechanism about to be described.

On the platform 460 (see Figures 40 and 41) is mounted a bracket 738 which comprises the base plate portion 724 adapted to be bolted as at 740 to the platform 460. This bracket has an outstanding overhanging arm 742, provided at its end with a lug 744 to which is secured a depending arm 746. This arm has at its lower end an aperture 748 to receive the pivot pin, see Figure 37. The base 724 likewise forms a support for the bracket 722 upon which the toothed segment 718 is pivotally mounted. On the underside of the ledge 724 there is mounted a depending bracket 752 which likewise has an aperture 754 to receive a pivot pin 756. The pin 756 supports the driving pinion 758 which is shown in perspective in Figure 36. This pinion engages the toothed sector 718 and is freely mounted upon the pin 756 in a bushing 760. Formed integral with the pinion 758 (see Figures 35, 36 and 39) is a collar 760 having an insert 762 adapted to cooperate with a plunger 764 which has a tooth 766 adapted to engage a groove 768 in the insert 762. The plunger 764 is housed within a ferrule 770 threaded into an opening 772 on a boss 774 which boss projects and forms a collar 776, this collar surrounding the collar 760, as shown in Figure 35. Within the housing 770 there is positioned a coil spring 778 adapted to press the plunger 764 inwardly to maintain the tooth 766 in the keyway 768. A nut 780 holds the spring compressed between the inner surface of the nut 780 and the head 784 of the plunger 764. A yoke member 786 (see Figures 34 and 41) connects the collar 776 with a collar 788 on the opposite end of the yoke member 786 to form a pair of bearings 806 adapted to pivotally shift on the pivot pins 750 and 756, as shown in Figures 34 and 37. The yoke-shaped piece 786 is provided on its top with a countersunk ledge 790 and with suitably spaced apart threaded openings 792 and 794. A pair of paddles 796 and 798 are screwed rigidly to the underside of the yoke 786 by means of suitable bolts 800.

The yoke 786 has the spaced, threaded openings 802 and 804 to which are fastened bearing blocks 806 and 808 by means of bolts to support a shaft 810 which projects into the openings 812 and 814 in the blocks, and forms a bearing support for the aforementioned shaft 810. In addition, the central portion of the shaft 810 has keyed thereto a short sleeve 816 which has an extending ledge 818 which supports an angle plate 820. Also supported and keyed on this shaft 810 are two fingers 822 and 824, and they are straddled by the bearings 806 and 808 as shown in Figure 37. These fingers are adapted to lie in correspondingly shaped, but somewhat larger cut out portions 826 and 828 in the paddles 796 and 798. The angular plate 820 hereinbefore mentioned cooperates with a stationary stop 830 (see Figures 38 and 45) which stop is adjustably mounted on a bracket 832 bolted as at 834 on the stationary central pedestal member 160.

Operation

In the operation of the device, rotation of the pinion 758 by the segmental rack 718 alternately rotates the pinion in reverse directions which, through the key 766 and the keyway 768 rotates the collar 776 about the pivot pins 750 and 756 whereby to swing the yoke 786 in a counterclockwise direction, as shown in Figures 42 and 43. At this time the paddles 796 and 798, mounted on the yoke, have been positioned by means of the vertical downward reciprocation of the slide 726 so that the paddles, as shown in Figure 42, are placed directly over the cut face of the half fruit as the latter is sustained in predetermined position in each fruit cup. It will be understood that prior to the positioning of these paddles in relation to the cut face of the half fruit and in substantial registry therewith, the ejector mechanism has been in elevated position prior to the movement of the fruit cups into a position to have the half fruits removed. After the cups have come to a stationary position the ejector mechanism lowers until the lower faces of the paddles 796 and 798 are positioned slightly above the cut surfaces of the half fruit. The paddles 796 and 798 do not actually come in contact with the cut face of the half fruit, prior to turning as will be seen in Figure 42. After the paddles are in the position as shown in Figure 42, the operation of the fruit ejecting mechanism continues. The rotation of the vertical shaft 46 hereinbefore mentioned, causes the interconnecting links 692 and 694, et cetera, to rotate the segmental gear 718 to rotate the pinion 758, which causes the yoke 786 to swing in a counterclockwise direction, causing the paddles 796 and 798 to contact the cut face of the half fruit and as the paddles sweep in this counterclockwise direction about the pivot pins 750 and 756 as centers, the paddles generally invert the half fruits relatively to the supporting cups and shift the half fruits to the position shown in Figure 44, the center of rotation being in alignment with the cut face of the half fruit. As the paddle members swing in this counterclockwise direction, the angle plate 820 therein passes the stationary stop 830 without contacting the same. At this point the platform 460, upon which the peeling mechanism is mounted, is raised due to the vertical upward movement of the vertical slide 720. Upon the raising of this platform 726, the ejector mechanism mounted thereon is likewise raised until the angle plate 820 contacts the stationary stop 830, as shown in Figure 45. This actuates the fingers 822 and 824 in a counterclockwise direction, as shown in Figure 45, and since these fingers have been disposed in the slots 826 and 828 of the paddles, and thereby underlying the cut faces of the half fruits, they will upon rotation cause the half fruits to be projected with a straight line movement directly outwardly laterally as shown in dotted lines in Figure 45, whereby to discharge the half fruit from the cups. This ejection of the half peaches may be onto a travelling conveyor 836, or the half peaches may be ejected into containers. The operation of the fingers 822 and 824 takes place with great rapidity whereby abruptly to eject the half fruit from the face of the paddle mechanism. The purpose of the slots 826 and 828 in the smooth upper faces of the paddle mechanism is to form a space for the fingers 822 and 824 and also to form an opening to serve to break the vacuum between the sticky cut faces of the half fruit and the upper surfaces of the paddles, this in connection with the fact that the fingers 822 and 824 operate within the slots serves to prevent the formation of this vacuum and to cause the quick rolling ejection of the half peaches from the paddle mechanism as shown in Figure 45.

In addition to this, it is to be noted that the paddle mechanism operates to sweep in a direction transversely of the arrangement of the alternate slots and grooves 734 and 736 in the cup, whereby the ejecting operation does not interfere with the tendency of the grooves in the cup to grip and hold the peach peeling therein. The junction between the peeled peach and the inner face of the skin is rather a slick one and thus the peeled peach is free to slide arcuately and along the inner faces of the peelings, the latter being gripped between grooves in the cups. When the segmental gear shifts in the reverse direction, the parts are restored to their starting positions, this movement following thereafter the peeling head slide 726 which rises to restore the paddle members upwardly in spaced relation away from the cup members which latter thereupon are driven by the Geneva movement to the next station and simultaneously therewith a successive pair of cups carrying half fruits therein is presented to the fruit discharging station directly under the elevated position of the paddles. On the next descent of the vertical slide both the peeling mechanism and the fruit discharging mechanism are brought downwardly, the paddles being positioned as shown in Figure 42, in registration with the half fruits in the cup.

It will thus be seen that there is provided a fruit discharging mechanism of the character described, that is of few parts and compactly arranged, the ejecting mechanism being arranged to operate in a substantially gentle manner so as to handle the ripe freestone peaches in a manner not to bruise them. The peaches are turned out of the peeling cups and tossed gently from the paddles in line with the turning, as against the construction of the prior patent which threw the peaches sidewise against the tilting chutes. The present mechanism also has the advantage of its being quicker and easier to change the ejector paddles when changing from one size of fruit to another.

In addition, since the fruit is removed from the peeling cups in a direction transversely to the longitudinal disposition of the ribs and grooves, and furthermore, since the peeling knives sometimes break and leave the peeling on the fruit when it reaches the discharge station, if this happened the fruit would not turn out of the cup and the mechanism would be unable to turn, which would result in the breakage of parts. By the use of the spring-pressed plunger 764 safety device shown in Figure 35 this danger of breakage is eliminated. In this safety device the spring keeps the plunger in contact with the key-way in the pinion with sufficient strength to retain this position during the normal running of the machine, but should the yoke member be held from turning, for instance if a peach reached the discharge station with the peeling not severed from the fruit, the spring 778 yields sufficiently to allow the disengagement of the plunger with the key-way, thereby allowing the gear to complete its cycle without rotating the frame, and the center of rotation of the yoke 790 coincides with the center of the inner wall of the peeling cup, and the face of the ejector paddles 796 and 798 lie about one eight of an inch above this center. This is done so that at no time while the fruit is being turned out of the cup will there be any unnecessary pressure on the fruit between the paddles and the inner walls of the fruit cup.

It is thought that the invention and numerous of its attendant advantages will be understood from the foregoing illustrative description and it is obvious that numerous changes may be made in the form, construction and arrangement of the several parts without departing from the spirit or scope of the invention or sacrificing any of its attendant advantages, the form herein described being a preferred embodiment for the purpose of illustrating the invention.

Having thus described the invention, what is claimed as new and desired to be secured by Letters Patent is:

1. In a fruit treating machine, a cup for receiving fruit to be treated, a conveyor to which said cup is secured for carrying fruit received in the cup from a peeling station to a fruit discharging station, a peeling knife movable through the cup at the peeling station in juxtaposition to the fruit supporting surface of the cup, said cup having in its fruit supporting surface a plurality of grooves receiving a portion of the peeling displaced by the knife as it moves through the fruit, and fruit ejecting means comprising a fruit discharging member mounted to move through the cup at the fruit discharging station in direction transverse to said grooves whereby said grooves retain the peeling in the cup as said member moves through the cup to discharge the fruit from the cup.

2. In a fruit treating machine, a fruit conveyor including a cup for receiving the fruit, means for peeling the fruit and leaving the peeling about the fruit but severed therefrom, and a fruit ejecting member movable through the cup to extract the fruit from the cup, said cup having in its fruit supporting surface a plurality of grooves extending transverse of the path of movement of said member through the cup to retain the peeling in the cup.

3. In a device of the class described, in combination with a turret having a plurality of fruit cups adapted to move in a predetermined arcuate path in a horizontal plane, fruit discharging means adapted vertically to shift toward and from the turret and to be positioned directly over the cut face of a half fruit while supported in a fruit cup, means for rotating the discharging means about an axis passing substantially through the cut face of the half fruit and lying substantially tangential to the path of movement of the center of the half fruit carried in the cup as the cup passes beneath the fruit discharging means while simultaneously raising the discharging means away from the fruit cup whereby substantially to invert the half fruit turning it in a direction outwardly of the center of the turret, and means operative during the raising of said discharging means for forcing the half fruit from the discharging means.

4. In a device of the class described, in combination with a turret having a plurality of fruit cups adapted to move in a predetermined arcuate path in a horizontal plane, fruit discharging means adapted vertically to shift toward and from the turret and to be positioned directly over the cut face of a half fruit while supported in a fruit cup, means for rotating the discharging means about an axis passing substantially through the cut face of the half fruit and substantially tangential to the path of movement of the center of the fruit carried in a fruit cup when passing beneath said discharging means while simultaneously raising the discharging means away from the fruit cup whereby substantially to invert the half fruit, turning it in a direction outwardly of the center of the turret, and means underlying the cut face of the half fruit and adapted to impact the same to cause the half fruit to roll off the discharging means in a direction outwardly of the turret.

5. In a device of the class described, in combination with a turret having a plurality of fruit cups adapted to move in a predetermined arcuate path in a horizontal plane, fruit discharging means adapted vertically to shift toward and from the turret and to be positioned directly over the cut face of a half fruit while supported in a fruit cup, means for rotating the discharging means about an axis passing substantially through the cut face of the half fruit and lying substantially tangential to the path of movement of the center of the fruit carried in a fruit cup as the latter underlies the fruit discharging means while simultaneously raising the discharging means away from the fruit cup whereby substantially to invert the half fruit, turning it in a direction outwardly of the center of the turret, and means underlying the cut face of the half fruit and adapted to impact the same to cause the half fruit to roll off the discharging means in a direction outwardly of the turret, and said last named means being carried by the discharging means and being shiftable relatively thereto.

6. In a device of the class described, the combination of a cup-shaped holder to hold a half fruit therein with its cut face uppermost, a substantially flat elongated paddle having a free end and adapted to be positioned in registration with the cut face of the half fruit, the free end when the paddle is so positioned lying adjacent to but spaced from the inner wall of the cup-shaped holder, means for turning the paddle on an axis passing through the center of the half fruit at the cut face thereof to cause the paddle to sweep through the cup, the free end passing arcuately along and in spaced relation to the inner walls of the cup and functioning to turn the half fruit on the paddle to a positon whereat said half fruit is generally inverted and lies at the mouth of the fruit cup in inclined position with the free end of the paddle projecting into the fruit cup, and means in said position for raising the inclined paddle such that the free end thereof is elevated to substantially the plane of the mouth of the cup adjacent the inner wall thereof, and means associated with the inclined paddle and underlying the higher edge of the half fruit while so positioned for raising quickly upwardly on said half fruit, whereby to roll the same out of and away from said cup.

7. In a device of the class described, in combination with a carrier having a fruit cup adapted to hold a half fruit therein with the peeling severed from the half fruit and underlying the same, means to move the fruit cup in a predetermined path, the internal wall of the fruit cup being provided with a groove adapted to receive a portion of the severed peeling, and means movable transversely of and over the groove of the cup to turn the peeled fruit relatively to the cup without dislodging the peeling from the cup.

8. In a device of the class described, in combination with a carrier having a fruit cup adapted to hold a half fruit therein with the peeling severed from the half fruit and underlying the same, means to move the fruit cup in a predetermined path, the internal wall of the fruit cup being provided with spaced apart grooved portions arranged in parallelism, and means engaging the flat face of the half fruit and turning the half fruit relatively to its peeling to discharge the fruit from the cup, the turning means moving transversely of and over the grooved portions of the cup, said grooved portions serving to hold the peel during the turning of the half fruit.

9. In a device of the class described, in combination with a carrier having a fruit cup adapted to hold a half fruit therein with the peeling severed from the half fruit and underlying the same, means to move the fruit cup in a predetermined path, the internal wall of the fruit cup being provided with a grooved portion adapted to grip the severed peeling, fruit discharging means adapted to be placed into registration with the open mouth of the fruit cup and relatively close to the cut face of the half fruit supported therein, means for moving the discharging means to cause it to move through the fruit cup in a direction transversely of and over the grooved portion whereby to remove the half fruit therefrom while leaving the peeling in the grip of the grooved portion of the cup.

10. In a device of the class described, in combination with a carrier having a fruit cup adapted to hold a half fruit therein with the peeling severed from the half fruit and underlying the same, means to move the fruit cup in a predetermined path, the internal wall of the fruit cup being provided with spaced apart grooved portions arranged in parallelism, means for rotating the fruit discharging means about an axis passing through substantially the center of the cup at the cut face of the half fruit, said fruit discharging means moving substantially transversely of and over the spaced apart grooves whereby to discharge the half fruit from the fruit holder, leaving the peeling therein.

11. In combination with a carrier adapted to move in a predetermined path, a fruit cup thereon, said fruit cup having its internal walls provided with spaced apart grooves disposed in parallelism, there being a half fruit in said cup with the peeling severed therefrom and loosely underlying the half fruit and conforming to the curved inner shape of the walls of the cup, said severed peeling having portions thereof gripped by the grooved portions of the walls of the cup, and means adapted to move through said cup in a direction transversely of and over the grooved portions of said cup to discharge the half fruit therefrom, said grooved portions serving to grip and retain the peeling in the cup during the fruit discharging operation.

12. In combination with a carrier, a fruit cup thereon adapted to move in a predetermined path, means at one portion of the carrier for depositing a half fruit in said cup, the inner walls of the fruit cup being provided with parallel disposed spaced apart grooves adapted to contact the curved peeling of the half fruit, the cut face of the half fruit being uppermost and being exposed, peeling means adapted arcuately to move through the flesh of the half fruit while supported in the cup to sever the peeling from the half fruit, said peeling means arcuately moving in a direction parallel to the disposition of the parallel spaced apart grooves, and fruit discharging means adapted to be positioned adjacent the cut face of the half fruit and means for moving the fruit discharging means to discharge the half fruit therefrom, said discharging means moving in a direction transversely of the disposition of the spaced apart parallel grooves of the cup whereby to discharge the peeled half fruit therefrom without discharging the loose peeling from the cup.

13. In combination with a peeling cup adapted to move in a predetermined path, said peeling cup having internal spaced apart parallel disposed grooves on its inner walls, said peeling cup adapted to support a half fruit therein with the peeling contacting the grooved inner walls of the cup and with the cut face of the half fruit exposed, peeling means adapted arcuately to move through and relatively close to the internal walls of said cup to sever the peeling from the half fruit, said grooved portions of the inner walls serving to grip spaced portions of the peeling for holding the same therein, and discharging means adapted to move through said cup and to contact the peeled half fruit for discharging the same therefrom, said discharging means moving through the cup relatively close to and over the inner walls and in a direction transversely of the parallel grooved portions thereof.

14. In a device of the class described, in combination with a turret adapted intermittently to rotate in a horizontal plane, a series of spaced apart cups mounted on the periphery of the turret and adapted to move in a predetermined arcuate path when the turret moves, each cup being provided with internal spaced apart parallel grooves, means forming a half fruit feed station for depositing half fruits into said cups as they arrive at said station, means forming a peeling station disposed relatively to the turret at an angle of substantially 90° from the feed-in station, a peeling mechanism at said station including a peeling knife mounted to swing arcuately, means for positioning the peeling knife into registration with a cup positioned at the peeling station so that the axis of movement of said knife lies transversely to the direction of location of said parallel grooves, means for arcuately swinging said knife through said cup whereby to cause said knife to move parallel to the direction of said grooves whereby to sever the peeling from said half fruit and to cause the peeling substantially to be wedged into the grooved portions of said cup and whereby to leave the peeling severed from and loosely underlying the peeled half fruit, and a fruit discharge station located relatively to the turret at an angular distance of substantially 90° from the peeling station, said fruit discharge station including a discharge member adapted to be brought into registration with the fruit cup containing a peeled half fruit, said discharge means including a member arcuately movable to sweep through the inner walls of a cup to engage the half fruit therein and turn the same out of the cup, said fruit discharging means swinging about an axis lying parallel to the direction of the spaced apart parallel grooves in the internal wall of the cup whereby said fruit discharge means moves angularly across said grooves in the cup so as to discharge the half fruit therefrom without interfering substantially with the gripping action of the grooves on the loose peeling of the fruit.

15. In a device of the class described, in combination with a turret adapted intermittently to rotate in a horizontal plane, a series of spaced apart cups mounted on the periphery of the turret and adapted to move in a predetermined arcuate path when the turret moves, each cup being provided with internal spaced apart parallel grooves, means forming a half fruit feed station for depositing half fruits into said cups as they arrive at said station, means forming a peeling station disposed relatively to the turret at an angle of substantially 90° from the feed-in station, a peeling mechanism at said station including a peeling knife mounted to swing arcuately, means for positioning the peeling knife into registration with a cup positioned at the peeling station so that the axis of movement of said knife lies transversely to the direction of location of said parallel grooves, means for arcuately swinging said knife through said cup whereby to cause said knife to move parallel to the direction of said grooves whereby to sever the peeling from said half fruit and to cause the peeling substantially to be wedged into the grooved portions of said cup and whereby to leave the peeling severed from and loosely underlying the peeled half fruit, and a fruit discharge station located relatively to the turret at an angular distance of substantially 90° from the peeling station, said fruit discharge station including a discharge member adapted to be brought into registration with the fruit cup containing a peeled half fruit, said discharge means including a member arcuately movable to sweep through the inner walls of a cup to engage the half fruit therein and turn the same out of the cup, said fruit discharging means swinging about an axis lying parallel to the direction of the spaced apart parallel grooves in the internal wall of the cup whereby said fruit discharge means moves angularly across said grooves in the cup so as to discharge the half fruit therefrom without interfering substantially with the gripping action of the grooves on the loose peeling of the fruit, and means disposed about the path of movement of the cup with respect to the turret to contact the loose peel in the cup and to eject it from the cup.

16. The herein described method of treating a half fruit which comprises supporting a half fruit in a fruit cup, passing a knife arcuately through the flesh of the half fruit just under the peeling of the half fruit whereby to sever the peeling therefrom while gripping the peeling at a plurality of zones disposed in parallelism along its curved extent, and thereafter contacting the severed half fruit at its cut face and turning it within, and relatively to, its peeling and transversely of said gripped parallel zones to discharge the half fruit from its peeling while the peeling is still held.

17. In a fruit treating apparatus, the combination of means providing a half fruit cup adapted to receive and hold a half fruit with the cut face exposed, means for contacting the cut face of the half fruit, means for turning the contacting means about an axis passing through substantially the center of the half fruit at its cut face to eject the half fruit from the cup and a yieldable release device disposed between the fruit contacting means and its turning means adapted to yield at a predetermined pressure.

18. In a fruit treating machine the combination of a fruit supporting means adapted to support a half fruit with its cut face exposed, elongated fruit ejector means adapted to be positioned adjacent the cut face of the half fruit while in the cup, said ejecting means having a free end the extremity of which is adapted to lie adjacent but spaced from the inner wall of the cup at the rim of the cup when the ejecting means is positioned adjacent the cut face of the half fruit, said ejecting means in such position extending across the open mouth of the cup and beyond the exterior diametrically opposite wall of the cup, actuating means connected to said extension for arcuately swinging said elongated ejecting means about an axis normal to the longitudinal axis of the ejecting means and which axis lies substantially at the center of and in a plane substantially at the mouth of the cup, whereby the free end of the ejecting means sweeps through the inner wall of the cup to cause said ejecting means to turn the fruit in the cup to a substantially inverted position outside of the cup including mechanism associated with the ejecting means to discharge the half fruit from the ejecting means.

19. In combination, a fruit cup having arcuately disposed inner surfaces for supporting an unpeeled half fruit, peeling means passing arcuately just under the skin of the half fruit, recessed means associated with the inner wall of the cup and having portions lying parallel to the path of movement of the peeling means and into which portions of the peel are moved outwardly during the peeling operation to facilitate such peeling operation and leaving the peeled half fruit loosely resting upon its severed peel, and means adapted to contact the cut face of the half fruit and to turn the same on and relatively to its peeling while in the fruit cup and shiftable away from the cup to eject the peeled half fruit from the cup, said ejecting means moving transversely to the recessed means whereby the latter serves to hold the peel in the cup during the ejection of the half fruit.

20. In combination, a fruit cup adapted to receive an unpeeled half fruit therein with the cut face of the half fruit exposed, arcuate peeling means adapted to swing through the cup to peel the half fruit, said cup having thereon peel receiving means disposed parallel to the direction of movement of the peeling means whereby relatively small spaced portions of the peeled skin move outwardly of the inner wall of the cup during the peeling operation to facilitate the peeling operation, and fruit ejecting mechanism adapted to contact the cut face of the half fruit and to sweep through the inner wall of the cup to turn the half fruit out of the cup, said fruit ejecting mechanism moving relatively to the inner wall of the cup and transversely of said peel receiving means whereby said fruit is discharged without removing the peeling from the cup.

21. In combination, a cup adapted to hold an unpeeled half fruit with its cut face exposed, peeling means adapted arcuately to sweep through the cup to peel the half fruit, leaving the peel in position and underlying the severed half fruit, and fruit discharging means adapted to contact the cut face of the half fruit and to sweep across the inner face of the severed peel in the cup to discharge the half fruit from the cup and leaving the peeling undisturbed therein, and means associated with the cup and disposed parallel to the path of movement of the peeling means and transversely of the path of movement of the fruit discharging means to facilitate both the fruit peeling and fruit discharging operations.

22. In combination, a cup adapted to hold an unpeeled half fruit with its cut face exposed, peeling means adapted arcuately to sweep through the cup to peel the half fruit, leaving the peel in position and underlying the severed half fruit, and fruit discharging means adapted to contact the cut face of the half fruit and to sweep across the inner face of the severed peel in the cup to discharge the half fruit from the cup and leaving the peeling undisturbed therein, and means countersunk in the wall of the cup and having portions disposed parallel to the path of movement of the peeling means and having portions disposed transversely of the path of movement of the fruit discharging means to facilitate the paring of the fruit in a manner to leave the peel in its original position lining the inner wall of the cup and to facilitate the discharge of the half fruit from the cup leaving the severed peel lining the inner wall of the cup.

23. In a fruit treating apparatus the combination of a half fruit cup adapted to receive and hold a half fruit with the cut face exposed, means to shift the fruit cup to a fruit ejecting station, elongated fruit ejecting means shiftably mounted at said station and adapted to be positioned adjacent the cut face of the half fruit while the latter is in the cup, said ejecting means having a free end adapted to lie adjacent but spaced from the inner wall of the cup, said ejecting means extending therefrom across the open mouth of the cup and beyond that portion of the opposite exterior wall of the cup which is diametrically opposite said first mentioned inner wall of the cup, actuating means connected to said ejecting means for arcuately swinging said ejecting means about an axis normal to the longitudinal axis of the ejecting means, and which axis lies substantially at the center of and in a plane substantially at the mouth of the cup to cause said free end of the ejector to sweep through the inner wall of the cup and invert the half fruit substantially out of the cup, and means for shifting said actuating means away from said cup after a predetermined arcuate movement of the ejecting means through the cup, whereby to discharge the half fruit from the cup.

24. In a fruit treating apparatus, the combination of a turret adapted to rotate about a central axis, spaced half fruit cups mounted on said turret for movement in an arcuate path with said turret, fruit ejecting means having a surface adapted to be successively positioned adjacent the cut faces of the successive half fruits carried by a cup, actuating means connected to said ejecting means and adapted to shift the same toward and from the cut face of a half fruit while in the cup, including mechanism for simultaneously turning the half fruits in their cups thereafter about a common axis extending substantially tangential to the arcuate path of movement of the cups of the turret as they pass beneath the fruit ejecting means, to a somewhat inverted inclined position relatively to the plane of the mouth of the cup and for shifting the inverted half fruit away from said plane of the mouth of the cup, said mechanism including means for substantially rolling the half fruit in substantially the plane of the mouth of the cup and away from the cup in a direction substantially radially outwardly of the central axis of the turret.

25. In a fruit treating apparatus, the combination of a turret turnable about a central axis, spaced fruit cups mounted thereon for movement in an arcuate path about said axis and each adapted to hold a half fruit with its cut face outermost, half fruit ejecting means positioned in overlying relation adjacent the cut face of a half fruit, actuating means for moving the ejecting means through the inner wall of a cup relatively to the cup and about an axis substantially tangential to the arcuate path of movement of the cups on the turret as they pass the fruit ejecting means to invert each half fruit in its cup to a position inclined to the horizontal, and also to raise the half fruit out of the cup so that the lower edge of the half fruit is substantially just above the outer edge of the fruit cup, and for rolling the half fruit out of the cup substantially just above and over said outer edge of the cup in a direction outwardly of and clear of the turret.

26. A fruit treating machine including a fruit feeding turret turnable about a central axis, fruit holding means mounted in spaced relation on said turret for carrying articles of fruit along a circular path to an ejecting station, fruit engaging means at said station, and means pivotally moving said fruit engaging means about an axis disposed substantially tangential to the path of movement of the center of the fruit carried in the fruit holding means as the fruit holding means passes the ejecting station to cause a portion of said fruit engaging means to move through said holding means to eject the half fruit therefrom in a direction substantially normal to the path of movement of said fruit holding means as it moves to said station, said fruit engaging means ejecting the half fruit in a plane substantially just above the mouth of said fruit holding means.

27. In a fruit treating machine, in combination with a turret, a plurality of fruit holding means adapted to support fruit halves therein with their cut faces uppermost, said fruit holding means being movable by said turret in a circular path past a fruit ejecting station, and fruit ejecting means operably disposed at said ejecting station and adapted to swing into the cup about an axis substantially normal to a radial plane of the turret located between adjacent fruit holding means when disposed at the ejecting station.

28. In a fruit treating machine, means for holding a half fruit with the cut face of the half fruit exposed, fruit ejecting means comprising a member for engaging the cut face of the half fruit and projecting diametrically of the open mouth of the cup from the inner wall of the cup at one side of the mouth across and beyond the exterior wall at the opposite side of the cup mouth, and means relatively swinging said member and fruit holding means about an axis substantially in the plane of the cut face of the half fruit and transversely of the direction of projection of said member to partially invert the half fruit and means thereafter relatively moving said member and fruit holding means to shift said axis and said cup to more remote relative positions to move the half fruit and member out of the fruit holding means.

29. A fruit treating machine including a fruit feeding conveyor having fruit holding means for carrying articles of fruit, means for moving said fruit holding means in succession along a predetermined arcuate path to an ejecting station, and means at said station for ejecting the fruit from said holding means in a horizontal plane substantially just above the upper edge of the fruit holding means, said ejecting means including a member pivotally mounted for movement through the holding means about an axis disposed substantially tangential to the path of movement of the center of the fruit carried in the holding means as the holding means passes the ejection station to eject the fruit out of the holding means clear of the path of movement of the next article of fruit to said station.

30. A fruit treating machine including a conveyor having fruit holding means carrying articles of fruit in succession along a predetermined arcuate path to an ejecting station, and means at said station for ejecting the fruit from said holding means when brought to said station by said conveyor, said ejecting means comprising a fruit engaging member mounted for swinging movement through the fruit holding means about an axis disposed substantially tangential to the path of movement of the center of the fruit holding means as the fruit holding means passes the ejecting station and in a plane substantially just above the uppermost edge of said fruit holding means to eject the fruit generally horizontally and at right angles to said path from said holding means and in a horizontal plane substantially just above said holding means.

31. In combination, a fruit holding cup, an elongated fruit engaging member having a free end and adapted to be positioned across the open mouth of the cup with its free end adjacent to but spaced from an inner wall of the cup, the elongated member extending across and projecting beyond the opposite exterior facial wall of the cup, shiftable means so supporting said fruit engaging member, and means for shifting said shiftable means about an axis substantially in the plane of the mouth of the cup in a direction to move the fruit engaging member through the cup to a position such that the free end of the fruit engaging member lies substantially adjacent the mouth of the inner wall of the cup at the mouth thereof and extends diametrically across the cup to a point beyond the exterior wall of the diametrically opposite wall portion with the elongated member overlying the mouth of the cup, and with the half fruit supported thereon.

32. In a device for discharging fruit from a fruit supporting cup, said device comprising a first fruit contacting member turnable about a first axis to extract the fruit from the cup and a second fruit contacting member turnable with said first member about said first axis and swingable relative to the first member about a second axis spaced from the first axis and parallel thereto to remove the fruit from the first member.

33. In a device of the class described, the combination of means providing a rotatable turret carrying a plurality of spaced apart fruit cups each adapted to carry a half fruit therein with its longitudinal seed axis disposed parallel to a radius of the turret, means to rotate the turret to cause the fruit cups to move arcuately in a horizontal plane, means forming a fruit discharge station disposed adjacent the arcuate travel of the cups including a vertically shiftable fruit discharge support, a fruit discharging member having a flat face adapted to be shifted vertically into registration with the cut face of a half fruit while supported in one of said cups, and means for rotating the fruit discharging member about an axis disposed substantially tangential to the path of movement of the center of the fruit carried in the fruit holding means as the fruit holding means passes the ejecting station and substantially at the cut face of the half fruit while the fruit is supported in the cup, substantially to invert the half fruit out of the cup, said fruit discharging mechanism turning in a direction and including means to cause the half fruit to be shifted in a direction outwardly of the center of the turret and outwardly of the path of movement of the cups.

34. In a device of the class described, in combination with a turret having a plurality of fruit cups adapted to move in a predetermined arcuate path in a horizontal plane, fruit discharging means disposed at a portion of the arcuate path of travel of said cup and adapted vertically to shift toward and from the turret and to be positioned directly over the cut face of a half fruit while supported in a fruit cup, means for rotating the discharging means about an axis passing substantially through the cut face of the half fruit in the cup and about an axis substantially tangential to the path of movement of the center of the fruit carried in each cup as the cup passes the fruit discharging station and means for simultaneously raising the discharging means away from the fruit cup substantially to invert the half fruit and means for rolling the raised and inverted half fruit in a direction outwardly away from the turret and cup.

35. In a device of the class described, the combination of a frame, a turret mounted for rotation in a horizontal plane thereon, said turret having spaced pairs of fruit cups thereon, each pair of cups being adapted to hold half fruits with the longitudinal seed axes of the half fruits disposed parallel to each other and extending in a general direction normal to the path of movement of said cups on said turret as they pass beneath the fruit discharging mechanism, fruit discharging means shiftable on said frame and adapted to be brought downwardly toward a pair of fruit cups, said discharging mechanism including a pair of devices having fruit contacting faces adapted to be brought into registration with and slightly above each cut face of each half fruit so supported in the pair of cups, means for turning the fruit discharging means simultaneously about a common axis disposed substantially tangential to the path of movement of the centers of the fruit carried in said fruit cups as the latter pass the fruit discharging mechanism, said common axis also passing through the central portions of the fruit cups in the plane of the cut faces of the half fruits therein whereby to discharge the half fruits from their cups.

36. In a device of the class described, the combination of a frame, a turret mounted for rotation in a horizontal plane thereon, said turret having spaced pairs of fruit cups thereon, each pair of cups holding two half fruits with their cut faces exposed and with the longitudinal seed axes of said half fruits parallel to each other, fruit discharging mechanism on said frame and operatively associated with the path of movement of the cups on said turret including a pair of devices having fruit contacting faces positioned into registration with and slightly above each cut face of each half fruit so supported in the pair of cups, means for turning the fruit discharging means simultaneously about a common axis passing through both of the central portions of the half fruits at the cut faces thereof whereby both half fruits are turned simultaneously about axes disposed transversely of their seed axes to invert and to discharge the half fruits from their cups.

37. In a device of the class described, in combination with a turret, a fruit cup to move in an arcuate path, said cup being adapted to hold a half fruit with its cut face exposed and with the longitudinal stem axis of the fruit extending in a predetermined direction substantially diametrally of the cup, an elongated ejector having a free end of a shape substantially corresponding to the shape of the cut face of the half fruit, means for positioning the free end of the ejector into registration with the cut face of the half fruit, means for turning the ejector on an axis passing substantially through the center of the half fruit substantially at the cut face thereof and about an axis extending transversely of the longitudinal stem axis of the half fruit so that the free end of the ejector sweeps through the cup and whereby the opposite end moves arcuately in a path wholly outside of and over the open mouth of the fruit cup to invert the half fruit and eject the same from the cup in a direction parallel to an axis of the turret and outwardly of the center of the turret.

38. In a fruit treating apparatus, the combination of a turret rotatable about a central axis, means providing a pair of spaced apart fruit holders on said turret each adapted to receive and hold a half fruit with its cut face uppermost and with the longitudinal stem axis disposed parallel to and on each side of a radius of the turret, means for contacting the cut face of each half fruit, means for simultaneously turning the contacting means about a common axis disposed transversely to the longitudinal stem axes of the half fruits and passing substantially through the diameters of both of the half fruits substantially at their cut faces and to simultaneously eject the half fruits from their fruit holders in a general direction outwardly away from the central axis of the turret and substantially parallel to the radius thereof.

39. In a device of the class described, in combination with a carrier having a fruit cup adapted to hold a half fruit therein with the peeling severed from the half fruit and underlying the same, means to move the fruit cup in a predetermined path, the internal wall of the fruit cup being provided with spaced apart grooved portions arranged in parallelism and into which grooved portions the peeling is lodged, fruit discharging means adapted to be placed into registration with the open mouth of the fruit cup and relatively close to the cut face of the half fruit supported therein, means for moving the discharging means to cause it to move through the fruit cup in a direction transversely of and over the grooved portions whereby to remove the half fruit therefrom, said grooved portions assisting in retaining the peeling in the cup.

HENRY A. SKOG.

REFERENCES CITED

The following references are of record in the file of this patent:

UNITED STATES PATENTS

| Number | Name | Date |
| --- | --- | --- |
| 1,989,090 | Ewald | Jan. 29, 1935 |
| 2,161,807 | Ewald | June 13, 1939 |
| 2,201,967 | Ewald | May 21, 1940 |
| 2,210,909 | Ewald | Aug. 13, 1940 |
| 2,210,910 | Ewald | Aug. 13, 1940 |
| 2,231,002 | Ewald | Feb. 11, 1941 |
| 2,242,242 | Ewald et al. | May 20, 1941 |
| 2,255,048 | Ewald | Sept. 9, 1941 |
| 2,255,049 | Ewald | Sept. 9, 1941 |
| 2,280,813 | Ewald | Apr. 28, 1942 |